United States Patent
Nemitallah et al.

(10) Patent No.: US 11,421,880 B2
(45) Date of Patent: Aug. 23, 2022

(54) CLEAN COMBUSTION SYSTEM WITH ELECTRONIC CONTROLLER AND GAS TURBINE

(71) Applicant: KING FAHD UNIVERSITY OF PETROLEUM AND MINERALS, Dhahran (SA)

(72) Inventors: Medhat A. Nemitallah, Dhahran (SA); Ahmed Abdelhafez, Dhahran (SA); Mohamed A. Habib, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/402,075

(22) Filed: Aug. 13, 2021

(65) Prior Publication Data

US 2021/0372619 A1 Dec. 2, 2021

Related U.S. Application Data

(63) Continuation of application No. 16/665,589, filed on Oct. 28, 2019, now Pat. No. 11,162,681.

(51) Int. Cl.
*F02C 3/34* (2006.01)
*F02C 7/08* (2006.01)
(Continued)

(52) U.S. Cl.
CPC .......... *F23R 3/045* (2013.01); *F02C 3/34* (2013.01); *F02C 7/08* (2013.01); *F23R 3/286* (2013.01);
(Continued)

(58) Field of Classification Search
CPC .... F23R 3/00; F23R 3/02; F23R 3/045; F23R 3/26; F23R 3/286; F02C 6/00; F02C 3/34;
(Continued)

(56) References Cited

U.S. PATENT DOCUMENTS 5,516,359 A * 5/1996 Kang ............... F01K 23/064
60/39.5
6,406,518 B1 * 6/2002 Bonaquist ........ C01B 23/0047
95/45
(Continued)

FOREIGN PATENT DOCUMENTS

JP 2016-85021 A 5/2016

OTHER PUBLICATIONS

"ARES AMB Turboexpander-Compressor Line", L.A. Turbine: The Turboexpander Company, https://laturbine.com/project-areas/#ARES-Gallery, Sep. 20, 2019, 10 pages.
(Continued)

*Primary Examiner* — William H Rodriguez
(74) *Attorney, Agent, or Firm* — Oblon, McClelland, Maier & Neustadt, L.L.P.

(57) ABSTRACT

An integrated ITM micromixer burner shell and tube design for clean combustion in gas turbines includes an oxy-fuel micromixer burner for separating oxygen from air within the burner to perform oxy-combustion, resulting in an exhaust stream that consists of $CO_2$ and $H_2O$. The shell and tube combustion chamber is designed so that preheated air enters a headend having an array of ion transfer membrane (ITM) tubes that separate oxygen from the preheated air and anchor flamelets on the shell side. The combustion products of the oxy-fuel flamelets expand through a turbine for power generation, before $H_2O$ is separated from $CO_2$ by condensation. A portion of the effluent $CO_2$ is compressed back into the burner system, while the remainder is captured for sequestration/utilization.

6 Claims, 14 Drawing Sheets

(51) Int. Cl.
*F23R 3/26* (2006.01)
*F02C 9/16* (2006.01)
*F23R 3/04* (2006.01)
*F23R 3/28* (2006.01)
*F02M 26/19* (2016.01)
*B01F 25/313* (2022.01)

(52) U.S. Cl.
CPC ........ *B01F 25/313311* (2022.01); *F02C 9/16* (2013.01); *F02M 26/19* (2016.02); *F23R 3/26* (2013.01)

(58) Field of Classification Search
CPC ...... F02C 7/08; F02C 9/16; F02C 9/26; F02C 9/28; F02M 26/19; B01F 5/0465; F23C 7/00; B01D 53/22
See application file for complete search history.

(56) References Cited

U.S. PATENT DOCUMENTS

| | | | |
|---|---|---|---|
| 6,702,570 | B2 | 3/2004 | Shah et al. |
| 6,709,483 | B1 | 3/2004 | Hodgson, Jr. |
| 6,916,362 | B2 | 7/2005 | Prasad et al. |
| 6,919,062 | B1 | 7/2005 | Vasileiadis et al. |
| 6,945,029 | B2 | 9/2005 | Viteri |
| 7,771,519 | B2 | 8/2010 | Carolan et al. |
| 8,114,193 | B2 | 2/2012 | Stein et al. |
| 8,820,312 | B2 | 9/2014 | Habib et al. |
| 9,004,909 | B2 | 4/2015 | Ghoniem et al. |
| 9,074,559 | B2 | 7/2015 | Nemitallah et al. |
| 9,383,096 | B2 | 7/2016 | Habib et al. |
| 9,664,115 | B2 | 5/2017 | Nemitallah et al. |
| 9,702,300 | B2 | 7/2017 | Nemitallah et al. |
| 10,180,253 | B2 | 1/2019 | Lee et al. |
| 10,260,416 | B2 | 4/2019 | Allam et al. |
| 2002/0023423 | A1* | 2/2002 | Viteri .............. F02C 6/18 60/39.182 |
| 2002/0043064 | A1* | 4/2002 | Griffin ............. F02C 3/34 60/311 |
| 2002/0088221 | A1* | 7/2002 | Griffin ............. F23R 3/40 60/311 |
| 2003/0039601 | A1* | 2/2003 | Halvorson ......... C01B 13/0251 422/600 |
| 2011/0067405 | A1* | 3/2011 | Armstrong ......... F23R 3/10 96/4 |
| 2012/0129110 | A1 | 5/2012 | Siljan |
| 2013/0186092 | A1 | 7/2013 | Bathina et al. |
| 2014/0216046 | A1* | 8/2014 | Armstrong ......... F02C 3/22 60/752 |
| 2015/0229094 | A1 | 8/2015 | Nagano et al. |
| 2015/0260105 | A1* | 9/2015 | Nemitallah ........ F02C 7/22 60/39.12 |
| 2015/0308676 | A1* | 10/2015 | Lee .............. F23C 7/00 431/121 |
| 2017/0284299 | A1* | 10/2017 | Nemitallah ......... F02M 27/00 |
| 2018/0038277 | A1* | 2/2018 | Habib ............. H02K 7/1823 |
| 2021/0372617 | A1* | 12/2021 | Nemitallah ........ F23R 3/286 |
| 2021/0372618 | A1* | 12/2021 | Nemitallah ........ F23R 3/286 |
| 2021/0381692 | A1* | 12/2021 | Nemitallah ........ F23R 3/286 |
| 2021/0381693 | A1* | 12/2021 | Nemitallah ........ F02C 7/08 |

OTHER PUBLICATIONS

"Characteristics and Use examples of 304 Stainless Steel", Boyer Steel, Inc., https://www.boyersteel.com/uses-304-stainless-steel-tubing/, Sep. 20, 2019, 3 pages.

"High temperature sensor—Thermocouple", WIKA USA, Model TC80, https://www.wika.us/tc80_en_ca.WIKA, Sep. 20, 2019, 2 pages.

Jaka Sunarso, et al., "Mixed ionic-electronic conducting (MIEC) ceramic-based membranes for oxygen separation", Journal of Membrane Science, vol. 320, Issues 1-2, Jul. 15, 2008, pp. 13-41 (Abstract only).

Binash A. Imteyaz, et al., "Combustion behavior and stability map of hydrogen-enriched oxy-methane premixed flames in a model gas turbine combustor", International Journal of Hydrogen Energy, vol. 43, Issue 34, Aug. 23, 2018, pp. 16652-1666 (Abstract only).

M.A. Nemitallah, et al., "Design of an ion transport membrane reactor for gas turbine combustion application", Journal of Membrane Science, vol. 450, 2014, pp. 60-71.

"MKS Type M100B Mass-Flo® Controller and Type M10MB Mass-Flo Meter", 123293-P1, Rev. B, 05/05, MKS Instruments, Inc., 2005, 73 pages.

* cited by examiner

CLEAN COMBUSTION SYSTEM WITH ELECTRONIC CONTROLLER AND GAS TURBINE

CROSS-REFERENCE TO RELATED APPLICATIONS

The present application is a Continuation of U.S. application Ser. No. 16/665,589, pending, having a filing date of Oct. 28, 2019.

BACKGROUND

Technical Field

The present disclosure is directed to a system and methods for using an integrated ion transport membrane (ITM) micromixer burner of shell and tube design for clean combustion in gas turbines.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The tremendous increase in energy demand due to increased population and rapid economics has resulted in increased levels of atmospheric pollutants and global warming. The global shift to the use of renewable clean energies still has some restrictions in terms of the availability of advanced reliable technologies and the cost of application compared to conventional fossil fuels. As full conversion to renewable energy proceeds slowly, the development of advanced techniques for clean combustion of fossil fuels is needed to curb global warming. Forced by the simultaneous increased pressure of strict emissions regulations and the target of limiting global warming to 2° C., gas turbine manufacturers have developed new combustion techniques for clean power production in gas turbines. These new techniques depend either on modification of existing combustion systems or the development of novel burners for clean power production. One of these techniques is to control engine emissions while generating stable flame by using a micromixer stabilized burner.

A micromixer is based on the principle of mixing fuel and an oxidizer on a miniature scale. Multiple straight tubes of millimeter-scale diameter are arranged in a parallel array between front and back faceplates, which form a cavity surrounding the tubes between the faceplates. The incoming oxidizer flow is divided among those tubes, and fuel is injected from the surrounding cavity through numerous sub-millimeter-scale side holes in the tube walls. Thus, fuel is injected in a jet-in-crossflow fashion into the oxidizer stream. The axial location of fuel holes is chosen to create a premixing region inside each tube, which guarantees a fully developed, fully premixed jet exiting the tube. To minimize the premixing length, two or more fuel holes are evenly spaced around the perimeter of each tube at the same axial location. Flow conditioners are utilized within the fuel tubes to ensure uniform distribution of fuel among all injection holes. From a combustion perspective, the faceplate geometry (jet spacing and diameter and number of jets) is tailored to optimize emissions and control combustor operability. The pressure drop of oxidizer flow across micromixer and the operational equivalence ratio are both chosen carefully to prevent flame flashback.

One of the key aspects behind the success of micromixer technology is its innate flexibility to accommodate staging, scalability, and fuel dilution and flexibility. York et al. performed a full-can durability test of micromixer nozzles at the combustor-inlet and firing conditions of General Electric's F-class gas-turbine conditions at full engine load with air as oxidizer and different fuel blends of hydrogen, natural gas, and nitrogen. During 100 hours of accumulated firing, NOx emissions were recorded at single-digit ppm levels using a blend of hydrogen and nitrogen as fuel with more than 90% hydrogen by volume. (See York W. D., Ziminsky W. S., and Yilmaz E., "Development and Testing of a Low NOx Hydrogen Combustion System for Heavy-Duty Gas Turbines", Eng. Gas Turbines Power, 2013; 135,022001, incorporated herein by reference in its entirety).

Funke et al. conducted an experimental/numerical study of the impact of momentum-flux ratio on flame anchoring and NOx-emissions in micromixer nozzles using hydrogen as fuel and air as oxidizer. (See Funke H. H. W., Boerner S., Keinz J., Kusterer K., Kroniger D., Kitajima J., Kazari M., and Horikawa A., "Numerical and Experimental Characterization of Low NOx Micromix Combustion Principle for Industrial Hydrogen Gas Turbine Applications", Proc. ASME Turbo Expo, 2012; 2, 1069-1079, incorporated herein by reference in its entirety).

Dodo et al. tested micromixer air-combustion of IGCC-syngas fuel simulants containing hydrogen, methane, and nitrogen with a hydrogen content of 40-65%. Three fuel blends were considered with 0, 30, and 50% carbon-capture rate. Stable combustion was observed for all blends with single-digit ppm NOx. (See Dodo S., Asai T., Koizumi H., Takahashi H., Yoshida S., and Inoue H., "Combustion characteristics of a multiple-injection combustor for dry low-NOx combustion of hydrogen-rich fuels under medium pressure", Proc. ASME Turbo Expo, 2011; 2, 467-476, incorporated herein by reference in its entirety).

When nitrogen is released during fuel combustion it combines with oxygen atoms to create nitric oxide (NO). This further combines with oxygen to create nitrogen dioxide ($NO_2$). Nitric oxide is not considered to be hazardous to health at typical ambient concentrations, but nitrogen dioxide can be. Nitrogen dioxide and nitric oxide are referred to together as oxides of nitrogen (NOx).

NOx gases react to form smog and acid rain as well as being central to the formation of fine particles (PM) and ground level ozone, both of which are associated with adverse health effects.

NOx is produced from the reaction of nitrogen and oxygen gases in the air during combustion, especially at high temperatures. In areas of high motor vehicle traffic, such as in large cities, the amount of nitrogen oxides emitted into the atmosphere as air pollution can be significant. NOx gases are formed whenever combustion occurs in the presence of nitrogen—e.g. in car engines; they are also produced naturally by lightning.

NOx mainly impacts respiratory conditions by causing inflammation of the airways at high levels. Long term exposure can decrease lung function, increase the risk of respiratory conditions and increases the response to allergens. NOx also contributes to the formation of fine particles (PM) and ground level ozone, both of which are associated with adverse health effects.

Additionally, high levels of NOx can have a negative effect on vegetation, including leaf damage and reduced growth. It can make vegetation more susceptible to disease and frost damage. NOx also reacts with other pollutants in the presence of sunlight to form ozone which can damage vegetation at high concentrations.

Air combustion of hydrocarbon fuels is a main source of both NOx and $CO_2$ emissions. Due to the existence of nitrogen in air, NOx is generated within the combustion zone, and the rate of production increases with flame temperature. In case of non-premixed flames, air and fuel are not mixed upstream of the combustion zone. As they diffuse towards each other within the flame, stoichiometric spots are created with very high local temperatures, resulting in increased NOx emissions. (See Nemitallah, M A and Habib, M., "Experimental and numerical investigations of an atmospheric diffusion oxy-combustion flame in a gas turbine model combustor", Applied Energy, 2014; 111: 301-415, incorporated herein by reference in its entirety).

In order to prevent stoichiometric spots, air and fuel can be mixed upstream to prevent the creation of such and, accordingly, control NOx emissions. Another solution is the combination of premixing and the use of pure oxygen in combustion instead of air. Using pure oxygen results in $CO_2$ and $H_2O$ as the main combustion products, with NOx emissions mainly eliminated. The $CO_2$ can be captured completely after a simple condensation process to separate the $H_2O$. (See Nemitallah M A, Habib M A, Mezghani K., "Experimental and numerical study of oxygen separation and oxy-combustion characteristics inside a button-cell LNO-ITM reactor", Energy 2015, 84, 600-611, incorporated herein by reference in its entirety).

Retrofitting an existing power plant to work under oxy-combustion conditions requires the integration of an air-separation unit (ASU) with the conventional combustion system, where the ASU is used to produce the required amount of oxygen for combustion. At the present state, ASU technology based on cryogenic distillation can meet the flow and purity requirements of large-scale boilers. In this unit, air is compressed, cooled, and cleaned before introducing it to the distillation column to make the separation process. Air is separated inside the ASU into a nitrogen-rich stream and an oxygen-rich one. (See Chen, L.; Zheng, S.; Yong; Ghoniem, A., "Oxy-fuel combustion of pulverized coal: Characterization, fundamentals, stabilization and CFD modeling. Progress in Energy and Combustion Science". 2012, 38 156-214, incorporated herein by reference in its entirety).

Cryogenic air separation consumes about 0.24 kWh/kg-$O_2$ at a purity of 95%, which corresponds to more than 15% of the total plant output power. (See Haslbeck, J.; Capicotto, P.; Juehn, N.; Lewis, E.; Rutkowski, M.; Woods, M.; et al., "In: Bituminous coal to electricity", Vol. 1. Washington D.C. 2007, DOE/NETL-1291; BERR. AEA Energy & Environment. 2007, COAL R309 BERR/Pub URN 07/1251; Andersson, K.; Johnsson, F., "Process evaluation of an 865 MWe lignite fired $O_2$/$CO_2$ power plant". Energy Conversion and Management. 2006, 47:3487-3498; Okawa, M.; Kimura, N.; Kiga, T.; Takano, S.; Arai, K.; Kato, M. "Trial design for a $CO_2$ recovery power plant by burning pulverized coal in $O_2$/$CO_2$". Energy Conversion and Management. 1997, 38:S123-7; and Varagani, R.; Chatel, F.; Pranda, P.; Rostam, M.; Lu, Y.; Bose, A. In: "The 4th annual conference on carbon sequestration". 2005, Alexandria, Va., U.S.A., each incorporated herein by reference in their entirety). Successful implementation of oxy-fuel combustion on mixed ionic-electronic conducting (MIEC) membranes is the ultimate goal that will allow conventional combustors to be replaced with oxygen transfer membrane reactors (OTMRs), where oxygen separation and oxy-combustion are co-located at the membrane instead of being performed separately. (See M. A. Habib, S. A. Salaudeen, M. A. Nemitallah, R. Ben-Mansour, and E. M. A. Mokheimer, "Numerical investigation of syngas oxy-combustion inside a LSCF-6428 oxygen transport membrane reactor," Energy, vol. 96, pp. 654-665, 2016; M. A. Habib and M. A. Nemitallah, "Design of an ion transport membrane reactor for application in fire tube boilers", Energy, vol. 81, pp. 787-801, 2015; M. A. Nemitallah, M. A. Habib, and K. Mezghani, "Experimental and numerical study of oxygen separation and oxy-combustion characteristics inside a button-cell LNO-ITM reactor," Energy, vol. 84, pp. 600-611, 2015; M. A. Nemitallah, M. A. Habib, R. Ben-Mansour, and A. F. Ghoniem, "Design of an ion transport membrane reactor for gas turbine combustion application," J. Memb. Sci., vol. 450, pp. 60-71, 2014; M. A. Nemitallah, M. A. Habib, and R. Ben-Mansour, "Investigations of oxy-fuel combustion and oxygen permeation in an ITM reactor using a two-step oxy-combustion reaction kinetics model," J. Memb. Sci., vol. 432, pp. 1-12, 2013; Imteyaz, B., M. A. Nemitallah, Abdelhafez, A., M. A. Habib "Combustion behavior and stability map of hydrogen-enriched oxy-methane premixed flames in a model gas turbine combustor", International Journal of Hydrogen Energy, Volume 43, Issue 34, 23 Aug. 2018, Pages 16652-16666, each incorporated herein by reference in their entirety).

Conventional micromixers perform a set of distinct functions. Fuel is premixed with air to create a lean mixture to be burned in a flame that is anchored at the micromixer exit. Metallic micromixer tubes are long enough to mix the fuel and air to ensure a fully developed flow entering the flame base, and to act as flame arrestors that prevent flame flashback upstream of the anchor point. The flame downstream of the micromixer comprises multiple small-scale flamelets. The large overall flame-front area of these flamelets reduces the bulk reaction time scale, which makes the combustor size more compact, thus producing lower NOx emissions due to the smaller residence time. However, NOx can never be fully eliminated in this design because of the inevitable reaction of air-based oxygen and nitrogen. Moreover, the effluent $CO_2$ is released into the atmosphere, as it is difficult to separate from the other combustion products, which adds to the global warming problem.

Accordingly, it is one object of the present disclosure to provide methods for clean power production in a gas turbine system and systems for a burner design to achieve clean power production in a gas turbine system. The burner integrates tubular oxygen-transport membranes within a micromixer geometry. The ion transfer membrane (ITM) tubes replace the conventional metallic micro-tubes of the micromixer. The membrane tubes are used to separate oxygen for performing oxy-combustion inside the main combustion chamber of the gas turbine. The combustion products are mainly $H_2O$ and $CO_2$, where the $CO_2$ may be captured after simple condensation of $H_2O$ for complete control of the gas turbine emissions.

SUMMARY

In an exemplary embodiment, a burner system for clean combustion in gas turbines is described, comprising an air manifold having an air inlet for receiving pressurized air, the air manifold for transporting the pressurized air to a combustor, the combustor including a first shell surrounding a plurality of air tubes, wherein each air tube is connected to the air manifold, wherein the combustor is configured to burn a mixture of fuel, carbon dioxide ($CO_2$) and oxygen ($O_2$), wherein burning the mixture heats the pressurized air in the air tubes, the combustor further including a combustion outlet port, at least one igniter and at least one thermocouple, a headend connected to the combustor, the headend including a second shell surrounding a plurality of ceramic ion transfer membrane (ITM) tubes equally spaced within the headend, wherein each air tube is connected to an air space in the headend between the plurality of ITM tubes, the headend further including a first oxygen depleted air outlet, a preheating unit connected to the headend, the preheating unit having a third shell surrounding a heat exchange tube, a fuel port, a recirculated $CO_2$ inlet port, an oxygen depleted air inlet and a second oxygen depleted air outlet, a thermally insulated pipe connected between the first oxygen depleted air outlet and the oxygen depleted air inlet, wherein the preheating unit receives fuel and recirculated $CO_2$ from the fuel port and recirculated $CO_2$ port respectively, wherein the fuel and recycled $CO_2$ are preheated in the preheating unit, enter the ITM tubes, mix homogeneously with oxygen, burn as flamelets, and generate combustion products in the combustor, wherein the combustion products exit the combustor at the combustion outlet port.

In another exemplary embodiment, a method for using an ion transfer membrane micromixer headend for power generation is described, comprising preheating fuel and recirculated carbon dioxide ($CO_2$) in a preheating unit, receiving pressurized air, from a main air compressor, into an air manifold for transporting the pressurized air to a combustion unit, receiving the pressurized air into a plurality of air tubes located in the combustion unit, wherein the combustion unit is configured for heating the pressurized air, receiving the heated pressurized air into a headend connected to the combustor, the headend including a shell surrounding a plurality of ceramic ion transfer membrane (ITM) tubes equally spaced within the headend, receiving the preheated fuel and recirculated $CO_2$ into the headend at a location opposite the combustor, wherein each of the plurality of ITM tubes is configured for separating oxygen ($O_2$) from the heated pressurized air and mixing the $O_2$ with the recirculated $CO_2$ and fuel. The method continues by burning, by the combustion unit, the mixture of $O_2$, $CO_2$ and fuel in flamelets extending between the longitudinal air tubes, and generating combustion products, exhausting the pressurized air into a heat exchange tube in the preheating unit, transporting the combustion products to a gas power turbine, generating electrical power by expanding the combustion products into the gas power turbine, exhausting the combustion products from the gas power turbine, condensing, by a condenser, the exhausted combustion products to separate water and $CO_2$, separating, by a splitter, the $CO_2$ into a first portion and a second portion, and sequestering, in a $CO_2$ storage location, the first portion.

In another exemplary embodiment, a non-transitory computer readable medium having instructions stored therein that, when executed by one or more processor, cause the one or more processors to perform a method for clean power generation by a gas turbine.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
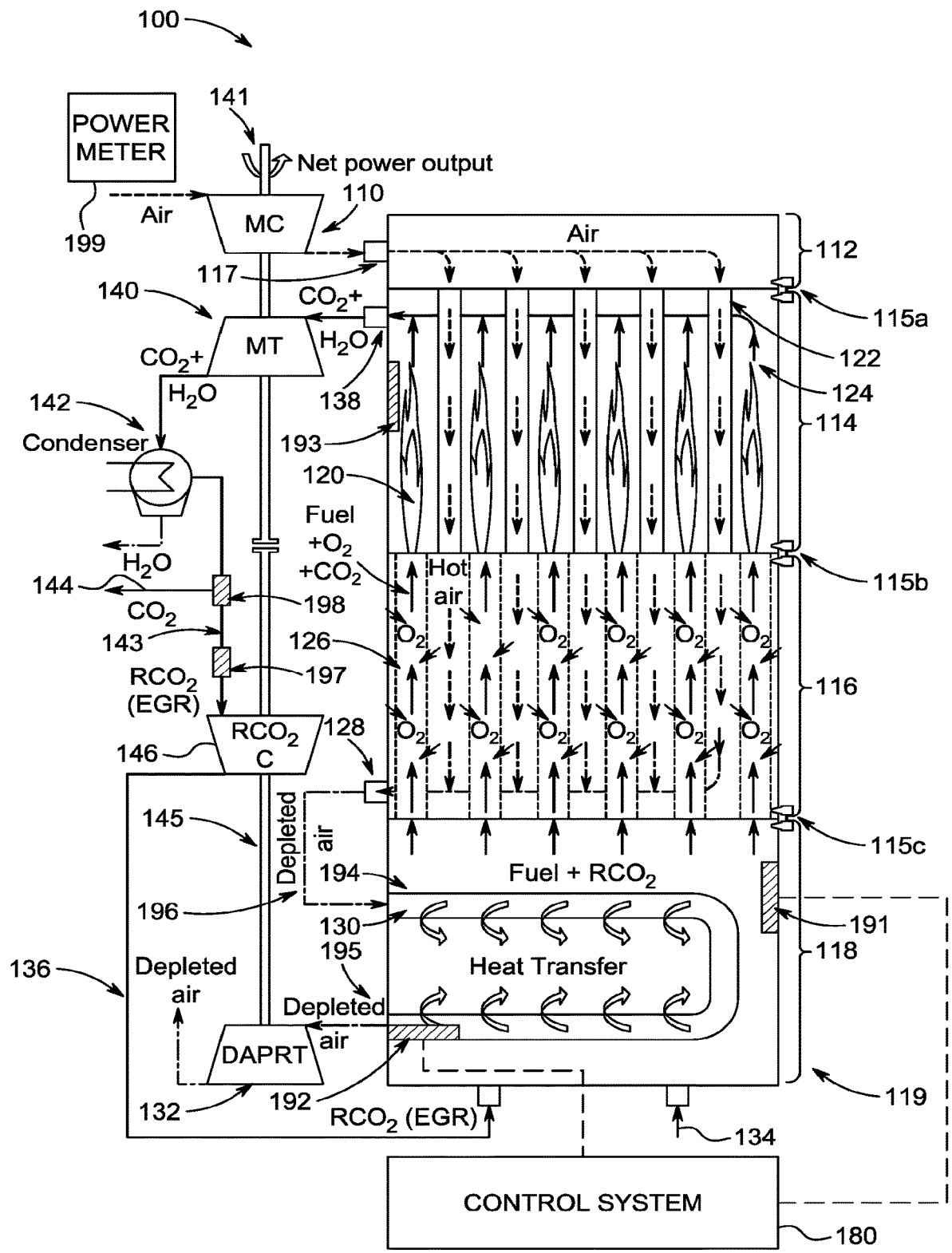
FIG. 1 illustrates a schematic diagram presenting an overview of the integrated ITM micromixer burner system for clean combustion in gas turbines.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The "equivalence ratio" ($\phi$) of a system is defined as the ratio of the fuel-to-oxidizer ratio to the stoichiometric fuel-to-oxidizer ratio. If the equivalence ratio is equal to one, the combustion is stoichiometric. If it is <1, the combustion is lean with excess air, and if it is >1, the combustion is rich with incomplete combustion.

Aspects of the present disclosure are directed to a burner system for clean combustion in gas turbines, a method for using an ion transfer membrane micromixer headend for power generation, and a non-transitory computer readable medium having instructions stored therein that, when executed by one or more processor, cause the one or more processors to perform a method for clean power generation by a gas turbine.

The present disclosure describes an integrated ITM micromixer burner of shell-and-tube design for clean combustion in gas turbines. Oxy-fuel combustion technology is integrated into micromixer gas-turbine combustors for using $CO_2$ and $H_2O$ as main combustion products. The combustion products are condensed to capture $CO_2$ and produce zero emissions. The integrated ITM micromixer burner may be used in gas turbines for electrical power production.

Some uses for captured $CO_2$ are as fertilizer and in the production of oil rich algae used for the production of plastics and as a feedstock for farm animals. $CO_2$ may be converted into hydrocarbons where it can be stored or reused as fuel or to make plastics. Oxy-combustion technology is crucial to the feasible implementation of $CO_2$ capture. A stand-alone air separation unit is conventionally used to furnish the oxygen needed for oxy-combustion, which poses a load on the output of the power plant. Ion transfer membranes (ITMs) have been successfully developed in tubular form to separate oxygen from an air stream. State-of-the-art micromixer gas-turbine combustors have not yet adopted oxy-combustion. Aspects of the present disclosure take advantage of the geometric compatibility between tubular ITMs and micromixers to provide a combined oxy-combustion ITM micromixer.

Existing gas-turbine micromixer combustors have been developed to operate under air-fuel combustion conditions that produce a mixture of $CO_2$, $H_2O$, $O_2$, and $N_2$ in the exhaust. Separating the $CO_2$ from this mixture is a complicated process that captures only part of the $CO_2$ and requires high capital and running costs. The micromixer combustor of the present disclosure operates under oxy-fuel combustion conditions that produce only $CO_2$ and $H_2O$ as exhaust, so all of the former can be easily captured after simple condensation of the latter. Moreover, the fuel-flexibility and high stability of the micromixer technology are beneficial under oxy-fuel combustion conditions, which have previously been found to exhibit inferior stability and turndown compared to conventional air-fuel combustion.

Aspects of the present disclosure describe the integration the ion transfer membrane (ITM) technology with gas-turbine micromixer (MM) combustor technology to convert the latter to switch from conventional air-fuel combustion to emission-free oxy-fuel combustion with built-in separation of oxygen from air. The MM technology is inherently fuel-flexible and enjoys wide turndown ratios but has not previously been used under oxy-fuel conditions. Moreover, existing oxy-fuel combustors need external systems for producing the pure oxygen, e.g., cryogenic air-separation units, which have high energy demands and impose a significant efficiency penalty. Aspects of the present disclosure replace the metallic micro-tube array of a conventional MINI with an array of ITM tubes that separate oxygen from air inside the MINI itself, thus avoiding the energy penalty associated with oxygen separation. The membranes used in the reactor design are dense ceramic membranes, which carry out the separation of oxygen from air at elevated temperatures, typically 600 to 950° C. MIEC (mixed ionic electronic conducting) membranes, or ion transport membranes, may be fabricated using different methods and they are available commercially. In the present disclosure, hollow fiber ceramic membranes are used. One common technique to prepare the hollow fiber membranes is through a combined phase-inversion/sintering technique.

Ion transport membranes (ITMs) are composed of different inorganic compounds combinations. These compounds have a perovskite or fluorite configured crystal lattice structure. Ceramic materials of the perovskite type are frequently used more than any other materials in ITM reactors. Ion transport membranes (ITMs) conduct oxygen ions at elevated temperatures. Typically, the temperature for oxygen ion transport across the membrane is at least 550-700 degrees C. (See Sunarso, J., et al.: Mixed ionic-electronic conducting (MIEC) ceramic-based membranes for oxygen separation. J. Membr. Sci. 320(1-2), 13-41 (2008), incorporated herein by reference in its entirety).

The integrated oxy-combustion ITM micromixer can be connected to gas-turbine combustors for zero-emission electrical power production and process engineering and to industrial combustion applications for zero-emission operation.

A combustor design is presented that:
1) Utilizes purified, enriched or pure oxygen for combustion to facilitate cost-efficient capture of the effluent carbon dioxide for emission-free operation.
2) Needs no external systems for producing the oxygen or enriching an oxidant stream; the combustor has built-in components that separate the oxygen in high-purity form from air.
3) Recycles part of the effluent carbon dioxide to dilute the fuel-oxygen mixture for precise control of flame temperature within hardware-safe limits.
4) Utilizes a combustion technology that has been proven to be fuel-flexible and to facilitate wide range of stable operation.
5) Recovers the pressure and high temperature energy of the oxygen-depleted air stream to increase the overall system efficiency.

The micro-membrane tubes of the present disclosure are used to perform three functions, not including combustion, within what is called the ITM micromixer burner headend (116, FIG. 1):
(1) separate oxygen from air,
(2) mix the separated oxygen with a sweeping mixture of fuel plus $CO_2$, and
(3) act as flame arrestor to prevent flame flashback.
Combustion takes place within the shell-and-tube combustor 114 and not within the ITM micromixer burner headend.

The micromixer burner utilizes micro-membrane tubes to act as flame arrestors to prevent combustion from taking place within the membrane tubes. However, the fuel and oxidizer are mixed upstream of the combustor where $CO_2$ is recirculated as a diluent to the shell-and-tube combustor.

In an aspect of the present disclosure, an integrated ITM micromixer headend of shell-and-tube design is used to prepare a reacting mixture based on the micromixing of fuel, $CO_2$ and separated oxygen to be introduced to the combustor within the same compact unit.

A general overview of a system for power generation is illustrated in FIG. 1. Preheated air in shell-and-tube combustor 114 enters a headend 116 having an array of ion transfer membrane (ITM) tubes 126 that separate oxygen from the preheated air on the shell side. The energy of the preheated air activates the membrane material to separate oxygen that is swept on the inner side of the tubes. The combustion products of the oxy-fuel flamelets ($CO_2$+$H_2O$) 120 expand through a turbine 140 for power generation, before $H_2O$ is separated from $CO_2$ by condensation (at condenser 142). A portion of the effluent $CO_2$ 136 is compressed back into the burner system, while the remainder is captured (at 144) for sequestration/utilization. The recirculated $CO_2$ is mixed with fuel in an economizer/preheater unit 118, and the mixture is used to sweep the inner side of the ITM tubes. The jet flows exiting the tubes are a homogeneous mixture of fuel+$O_2$+$CO_2$ to burn in the oxy-fuel flamelets 120 downstream of the micromixer. The fuel may be methane. The oxygen-depleted air leaving the shell side of the ITM micromixer headend contains a significant amount of heat that is partially recovered by preheating the sweep fuel-$CO_2$ mixture in the economizer unit 130.

Increasing the temperature of the sweep gas helps maintain high membrane surface temperature for a larger oxygen-permeation flux.

The integrated ITM micromixer burner shell and tube design can be used in any combustion application in the energy sector to facilitate cost-efficient oxy-fuel operation for carbon capture. According to international climate-control initiatives, such as the Kyoto Protocol and the Paris Agreement, the 2° C. scenario cannot be achieved without implementing carbon capture and sequestration. Moreover, combustion applications may benefit economically by avoiding carbon taxes to be imposed on $CO_2$ emissions, because oxy-fuel operation is essentially emission-free.

The integrated ITM micromixer burner of shell-and-tube design for clean combustion and power production in gas turbines is shown in FIG. 1. Atmospheric air is compressed through a main compressor 110 (MC) to the peak pressure of the gas-turbine cycle. The cycle peak pressure depends on a required pressure of the pure $CO_2$ stream 144 to meet a target thermal efficiency and power output of gas-turbine cycle.

The compressor discharges air into the manifold 112 which distributes the compressed air among the tube array 122 of the shell-and-tube combustor 114. The tubes 122 are made of Inconel to withstand the extreme temperatures of the oxy-fuel flamelets 120. Multiple small-scale oxy-fuel flamelets 120 extend from the shell side of the combustor in the interspace 124 between the air tubes 122. Heat from the flamelets and combustion products transfers through the walls of the air-tube array 122 to preheat the compressed air flowing within. The preheated air then enters the shell side of the integrated ITM micromixer shell-and-tube headend 116. The shells of 114, 116 and 118 are constructed of stainless steel. The conventional metallic micro-tube array of micromixers is replaced in the present disclosure with an array of ion transfer membrane (ITM) tubes 126 that separate oxygen from the preheated compressed air on the shell (feed) interface. The temperature of the preheated air is high enough to activate oxygen permeation through the ITM 126 wall, preferably 550 to 700 C. The separated pure oxygen flows on the permeate side within the ITM tubes 126. After oxygen separation, the depleted air leaves the ITM micromixer headend through air port 128 and enters heat exchange conduit 130 of the shell-and-tube economizer/fuel-preheating unit 118. The conduit 130 acts as a heat exchanger to transfer the heat in the depleted air to the shell-and-tube economizer/fuel-preheating unit 118. In a non-limiting example, the heat exchanger conduit 130 may be made of 304 stainless steel, available from Boyer Steel, Inc., 26532 Groesbeck, Warren, Mich. 48089, USA.

Inconel is a family of austenitic (non-magnetic iron-based) nickel-chromium-based superalloys. Inconel alloys are oxidation-corrosion-resistant materials well suited for service in extreme environments subjected to pressure and heat. When heated, Inconel forms a thick, stable, passivating oxide layer protecting the surface from further attack. Inconel retains strength over a wide temperature range.

The shell-and-tube economizer/fuel-preheating unit 118 holds a mixture of fuel 134 and recirculated carbon dioxide 136 ($RCO_2$), which is preheated by the heat shed from the conduit 130. The temperature in the fuel preheating unit 118 is measured by a thermocouple 191. In a non-limiting example, the thermocouple may be a Model TC80, high temperature sensor thermocouple available from Wika USA, 1000 Wiegand Boulevard, Lawrenceville, Ga. 30043 USA, which is rated for a maximum temperature of 1600° C.

After heat exchange, the effluent depleted air exits heat exchange conduit 130 and enters a pressure-recovery turbine 132 (DAPRT) where it expands back to atmospheric pressure. The temperature at the exit of the heat exchange conduit is measured by thermocouple 192.

The pressure recovery turbine, also called a turboexpander, is a centrifugal or axial-flow turbine, through which a high-pressure gas is expanded to produce work that is often used to drive a compressor or generator. Because work is extracted from the expanding high-pressure gas, the expansion is approximated by an isentropic process (i.e., a constant-entropy process), and the low-pressure exhaust gas from the turbine is at a very low temperature, depending upon the operating pressure and gas properties. In a non-limiting example, the pressure recovery turbine may be an ARES AMB turboexpander-compressor, available from L.A. Turbine 28557 Industry Drive, Valencia, Calif. 91355, USA.

$RCO_2$ 136 is recycled from the combustion products (mainly $CO_2+H_2O$) of the oxy-fuel flamelets 120 inside the shell-and-tube combustor 114. These high-pressure high-temperature products exit the combustor at combustion port 138 to expand through a main turbine (MT) 140 for power generation. As shown in FIG. 1, the shaft of the main turbine 140 may turn the shaft 141 of the main compressor 110. The expanded products are then chilled in the condenser 142 to separate water from $CO_2$. Part of the $CO_2$ stream is captured 144 for sequestration or forwarded to purification plants for further utilization. The other part is recycled through the $RCO_2$ compressor 146 to the shell side 119 of the economizer unit 118, where it is mixed with fuel and preheated by the heat recovered from the depleted air. The mixture of fuel and $RCO_2$ flows inside the ITM tubes 126 of the ITM micromixer headend 116 to sweep the permeated oxygen and create a combustible Fuel+$O_2$+$CO_2$ mixture that burns in the oxy-fuel flamelets 120 inside the shell-and-tube combustor 114. The membranes within the ITM micromixer headend are operated in a counter-current arrangement, as the sweep and air flows on the permeate and feed sides, respectively, are opposite to each other. As shown in FIG. 1, the shaft 145 of DAPRT 132 may turn the $RCO_2$ compressor 146, making full use of the heat and pressure of the depleted air from the outlet of the heat exchange conduit 130.

Advantageous features of the integrated ITM micromixer burner for clean power production in gas turbines are as follows:

1. The top block comprises the air manifold 112 and shell-and-tube combustor 114, as shown in FIG. 1.
   a) At the air inlet 117 of the gas-turbine combustion system, the manifold 112 distributes the high-pressure compressor discharge air among the tube array 122 of the shell-and-tube combustor 114.
   b) The combustion chamber 114 is of shell-and-tube design, where air flows inside the tubes 122, and multiple oxy-fuel flamelets 120 extend from the shell side in the interspace between the air tubes. Air flows within the tube bundle in a counter-flow manner to the combustion gases outside of the tubes (note arrows) for effective preheating of the air before being introduced into the integrated ITM micromixer headend 116 (middle block).
   c) The hot, oxygen laden air from the combustor is injected into the ITM headend between the ITM tubes 126. $O_2$ permeates the ITM tube walls to mix with the fuel in the tubes. Premixed jets of fuel, $CO_2$, and $O_2$, emerging out of the ITM micromixer headend 116, are burned in the oxy-fuel flamelets. Each flamelet 120 is anchored at the exit of an ITM tube from the ITM micromixer headend.

d) Burning the fuel under oxy-combustion conditions results in an exhaust stream that contains mainly $CO_2$ and $H_2O$.

e) At the exit 138 of the combustion chamber 114, just before the manifold 112, the combustion products are collected to expand through a gas turbine 140 for power generation. Exit 138 may include a temperature sensor and a pressure sensor for computer control.

2. The middle block comprises the integrated ITM micromixer burner headend 116, which is a subject of the present disclosure. In this headend, the metallic microtube array of a conventional micromixer is replaced with an array of ion transfer membrane (ITM) tubes 126 that separate oxygen from the preheated compressed air, in preparation for oxy-fuel combustion within the combustion chamber, as shown in FIG. 1.

a) The integrated ITM micromixer headend is of shell-and-tube structure, where a mixture of fuel and $CO_2$ sweeps the separated $O_2$ inside the micro-membrane tubes, and the preheated compressed feed air flows through the shell side.

b) The sweep gases (fuel and $CO_2$) are fully premixed inside the economizer/preheating unit 118 (bottom block).

c) The energy required to activate the membrane material for oxygen separation is extracted from the preheated air stream leaving the shell and tube combustor 114 and in conduit 130 on the shell side of the economizer/preheating unit 118 (bottom block).

d) Oxygen permeates through the walls of the micro-membrane tubes from the feed air outside to the sweep gas inside the tubes.

e) The permeated $O_2$ mixes homogenously with the sweeping flow of fuel and $CO_2$ inside the long membrane tubes, before introducing the homogeneous mixture of fuel, $CO_2$, and $O_2$ into the oxy-fuel flamelets 120 within the combustion chamber.

f) The large length-to-diameter aspect ratio of the membrane tubes 126 allows them to act as flame arrestors to prevent flashback of the flame upstream of the combustor.

g) The feed and sweep flows (note arrows in 116, FIG. 1) on either side of the micro-membrane tube 126 walls are introduced in counter-current flow configuration to have effective heat and mass-transfer conditions for increasing the oxygen-permeation rate. The tubes 126 may have ceramic membranes, wherein the oxygen-permeation flux depends on the difference in $O_2$ partial pressure between either side of the membrane. The counter-current flow configuration allows for a uniformly distributed difference in $O_2$ partial pressure over the entire length of the membrane tube, which results in a uniformly distributed oxygen-permeation flux. Homogeneous mixing of permeated $O_2$ with fuel and $CO_2$ is thus achievable, which allows for accurate control of the characteristics of the oxy-fuel flames within the combustion chamber.

3. The bottom block comprises the economizer unit 118 that mixes and preheats the fuel 134 and recirculated-$CO_2$ stream 136 before introducing the mixture into the integrated ITM micromixer headend 116, as shown in FIG. 1.

a) The sweep-gas mixture (fuel+$RCO_2$) is prepared in the shell side of the shell-and-tube economizer unit 118 before being introduced into the ITM micromixer headend 116.

b) The hot oxygen-depleted air leaving the ITM micromixer headend 116 at port 128 enters the tube side 117 of the economizer unit (into conduit 130) to preheat the fuel-$RCO_2$ mixture, which recovers a portion of the heat content of that depleted air.

c) Preheating the fuel/$RCO_2$ mixture helps maintain high membrane surface temperature in the ITM micromixer headend 116 for higher oxygen-permeation flux.

d) The preheated mixture of fuel and $RCO_2$ is introduced into the ITM micromixer headend 116 as sweep gas passing inside the micro-membrane tubes.

In an aspect of the present disclosure, each of the top block, the middle block and the bottom block are configured with pivoting mechanisms 115a, b, c which allow each block to be rotated away from the adjacent blocks for cleaning or replacement of the tubes or other elements within the block.

Alternatively, each of the top, middle and bottom blocks may be integrated into a single unit.

Additional units are integrated with the combustion system for flow compression, power generation, and $CO_2/H_2O$ separation. These units include the main compressor 110, a power turbine 140 of the gas-turbine system, a condenser 142, a $RCO_2$ compressor 146, and a depleted-air pressure-recovery turbine 132. These are described below:

a) Main compressor 110 (MC): atmospheric air is compressed through this compressor to the peak pressure of the gas-turbine cycle.

b) Main power turbine 140 (MT): the exhaust gases leaving the combustion chamber expand through this turbine to generate power.

c) Condenser 142: the $CO_2+H_2O$ exhaust stream leaving the power turbine is chilled in the condenser to separate out the $H_2O$ for $CO_2$ capture. A portion 143 of the captured $CO_2$ is recirculated back into the combustor, and the remaining $CO_2$ 144 is compressed for sequestration/utilization. d) $RCO_2$ compressor 146 ($RCO_2$-C) the recirculated portion of the exhaust $CO_2$ is compressed back to the pressure of the shell side 119 of the economizer unit 118.

e) Depleted-air pressure-recovery turbine 132 (DAPRT): The high-pressure oxygen-depleted air leaving the ITM micromixer burner system expands through this turbine, which drives the $RCO_2$ compressor 146. Depending on the operating conditions, the $RCO_2$-C/DAPRT unit can exchange positive or negative power with the main gas-turbine system (MC/MT).

As shown in FIG. 1, thermocouples 191, 192, 193 are located in the preheating unit 118 near the headend 116, at the exit 195 of the heat exchange tube 130 and within the shell of the combustor respectively. Although not shown in FIG. 1, additional temperature (thermocouples) and pressure sensors are included at each of the ports 117, 138, 128, at each turbine 140, 132 and at each compressor 110, 146. Although not shown in FIG. 1, each combustion path between the tubes 122 in the combustor 114 may include a thermocouple. A pressure sensor and a pressure control are included at the entrance port 134 for the fuel. A control system 180 may be operatively connected to each thermocouple and pressure sensor to monitor the temperatures and pressures at each operating point.

The present integrated ITM micromixer burner reactor enjoys high efficiency. Heat is regenerated inside the system by preheating the compressed air using the combustion products inside the combustor. Moreover, the large energy content of depleted air is mostly recovered by preheating the fuel-$CO_2$ mixture inside the economizer unit (regeneration) and by expanding the depleted air through the pressure-recovery turbine. Depending on the operating conditions, the $RCO_2$-C/DAPRT unit can even produce positive power to assist the main gas-turbine system (MC/MT). The integrated ITM micromixer burner for gas-turbine applications is characterized by zero $CO_2$ and $NO_X$ emissions and is compact with minimal heat losses. The condenser allows for easy capture of $CO_2$. Water vapor in the exhaust of the main turbine is condensed and removed as liquid, resulting in a high-purity $CO_2$ stream. A portion of this $CO_2$ is recirculated back into the burner, while the rest is collected for sequestration/utilization.

Figure 6:
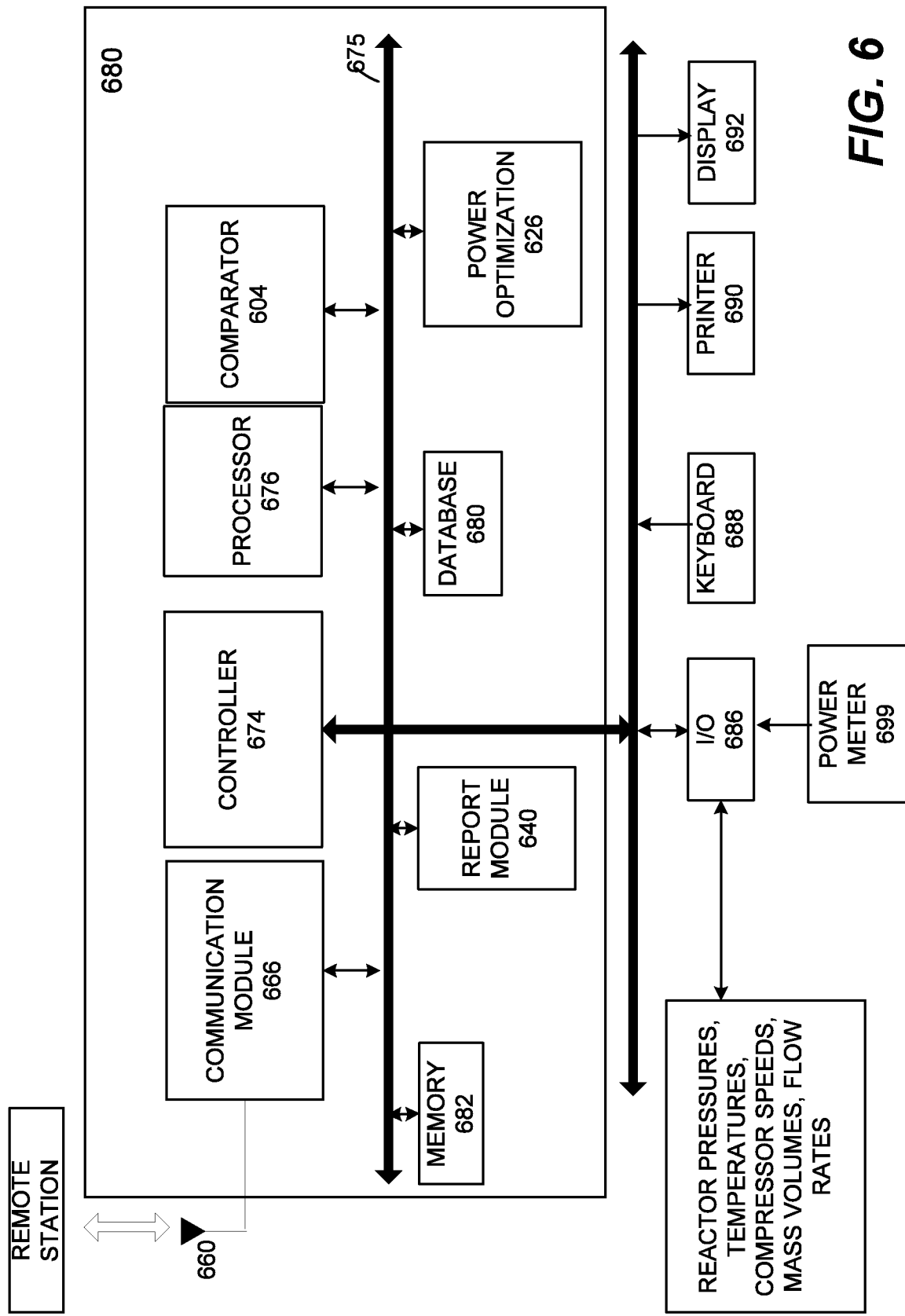
FIG. 6 illustrates the computer environment for operating the power generation.

The control system 180 is shown in more detail in FIG. 6. The control system 180 includes a controller 674, circuitry and program instructions configured to instruct a processor 676 to compare the temperatures and pressures to reference temperatures and pressures and to switch the speeds of the compressors and adjust the fuel flow. The controller may also monitor the power production at the power output and adjust compressor speeds and fuel flow accordingly. The controller may also be configured to monitor the mass flow rates of the $CO_2$ at the valve 198 to determine the mass volume of $CO_2$ sequestered versus the mass volume recycled to the shell of the preheating unit 118.

The control system 180 includes a communication module 666 at which instructions may be sent to or received wirelessly from a remote monitoring station. Alternatively, the instructions may be received through I/O port 686. Communication bus line 675 provides a communication pathway to connect the components of control system 180. Controller 674 is configured to instruct the processor 676 to access program instructions stored in memory 682 to compare temperature and pressure values to reference values stored in database 680 and feedback the comparisons to the controller 674. The controller 674 is configured to actuate the speeds of the compressors 110 and 146 based on the pressures and temperature comparisons. A power production optimization module 626 is configured to determine the reference values. The processor 676 may prepare a report 640 which includes the temperatures and pressures at each sensor, the speeds of the compressors, the power produced, the mass flow rates of $CO_2$ sequestered and recycled and the flow rate of the fuel. A comparator 604 is included to compare the pressure and temperature values, mass flow rates, fuel flow rate, and compressor speeds to reference values stored in the database 680 to optimize the power production. The controller is operatively connected to the communication module 666, I/O port 686, printer 690 and display monitor 692 to output the report.

The first embodiment is illustrated with respect to FIG. 1, 2A, 2B, 2C and FIG. 6. The first embodiment describes a burner system 100 for clean combustion in gas turbines, comprising an air manifold 112 having an air inlet 117 for receiving pressurized air, the air manifold transporting the pressurized air to a combustor, the combustor 114 including a first shell surrounding a plurality of air tubes 122, wherein each air tube is connected to the air manifold, wherein the combustor is configured to burn a mixture of fuel, carbon dioxide ($CO_2$) and oxygen ($O_2$), wherein burning the mixture heats the pressurized air in the air tubes, the combustor further including a combustion outlet port 138, at least one igniter and at least one thermocouple (not shown), a headend 116 connected to the combustor, the headend including a second shell surrounding a plurality of ceramic ion transfer membrane (ITM) tubes 126 equally spaced within the headend, wherein each air tube is connected to an air space in the headend between the plurality of ITM tubes (see "Hot Air", FIG. 1), the headend further including a first oxygen depleted air outlet 128. A preheating unit 118 is connected to the headend, the preheating unit having a third shell surrounding a heat exchange tube 130, a fuel port 134, a recirculated $CO_2$ inlet port 136, an oxygen depleted air inlet 194 and a second oxygen depleted air outlet 195, a thermally insulated pipe 196 connected between the first oxygen depleted air outlet and the oxygen depleted air inlet, wherein the preheating unit 118 receives fuel and recirculated $CO_2$ from the fuel port and recirculated $CO_2$ port respectively, wherein the fuel and recycled $CO_2$ are preheated in the preheating unit, enter the ITM tubes, mix homogeneously with oxygen, burn as flamelets 120, and generate combustion products in the combustor, wherein the combustion products exit the combustor at the combustion outlet port 138.

The first embodiment further includes a first pivot 115*a* located on the air manifold 112 opposite the air inlet and connected to the combustor, wherein the first pivot is configured to rotate the air manifold around the first pivot, a second pivot 115*b* located between the combustor 114 and the headend 116, wherein the second pivot is configured to rotate the combustor around the headend, a third pivot 115*c* located between the headend and the preheating unit, wherein the third pivot is configured to rotate the headend around the preheating unit.

Alternatively, the air manifold, combustor, headend and preheating unit may be an integrated unit.

The plurality of air tubes 122 of the combustor 114 are an array of non-magnetic iron-nickel-chromium-based alloy tubes, and wherein the first shell includes an inner shell of non-magnetic iron-nickel-chromium-based alloy.

The first, second and third shells are stainless steel on the exterior.

The plurality of ion transfer tubes 126 (ITM) is an array of micro-membranes configured to separate oxygen from air and mix the oxygen, $CO_2$ and fuel homogeneously. Each ITM tube has a large length to diameter ratio configured to prevent flashback of the flamelets, as shown in FIG. 2C), for example, each ITM tube has a first length $L_1$ of diameter $D_1$ and a second length $L_2$ of diameter $D_2$, wherein $L_2$ is approximately one-fifth of $L_1$ and wherein $D_2$ is approximately one third of $D_1$.

The first embodiment includes a control system 180 operatively connected to the air inlet 117, the first oxygen depleted air outlet 128, the combustion outlet port 138, the at least one igniter (not shown), the at least one thermocouple (191, 192, 193, FIG. 1), the second depleted air outlet 195, the fuel port 134 and the recirculated $CO_2$ port 136, wherein the air inlet, the first oxygen depleted air outlet, the igniter, the second depleted air outlet, the fuel port and the recirculated $CO_2$ port are computer controlled valves, wherein the at least one thermocouple senses the temperature of the preheated fuel, oxygen and recirculated $CO_2$ and generates a signal to the control system when the temperature is above a threshold, and wherein the control system actuates each computer operated valve to open the air inlet, the first oxygen depleted air outlet, the second depleted air outlet, the fuel port and the recirculated $CO_2$ port upon receiving the signal.

In a start-up condition, the fuel is preferably preheated before entering the preheating unit. The at least one thermocouple (191, 192, 193) senses the temperature of the preheated fuel, oxygen and recirculated $CO_2$ and generates a signal when the temperature is above a threshold, wherein the control system actuates the at least one igniter to generate a spark in response to the signal. This threshold is preferably in the range of 400 to 700° C., more preferably in the range of 500 to 700° C., even more preferably 550 to 700° C., most preferably 550° C.

The first embodiment further includes a main compressor 110 connected to the air inlet 117, a power turbine 140 having an input port connected to the combustion outlet port 138 for receiving combustion products from the combustor, the combustion products consisting of $CO_2$ and water ($H_2O$), wherein the power turbine is configured to rotate in response to receiving the combustion products and generate electricity, the power turbine exhausting recirculated $CO_2$ and $H_2O$ from an output port, wherein a shaft 141 of the power turbine 140 turns the main compressor. A condenser 142 has a first port connected to the output port of the power turbine, the condenser configured to separate the $H_2O$ from the $CO_2$ and expel the recirculated $CO_2$ from a second port. A splitter 198 is connected to the second port of the condenser, the splitter configured to separate the recirculated $CO_2$ into a first portion 144 and a second portion 143 and sequester the first portion.

A recirculated $CO_2$ compressor 146 is configured to receive the second portion of the recirculated $CO_2$, wherein a recirculated $CO_2$ outlet port of the recirculated $CO_2$ compressor 146 is connected to the recirculated $CO_2$ inlet port 136.

A depleted air recovery turbine 132 having a turbine shaft 145 is operatively connected to the recirculated $CO_2$ compressor 146, the depleted air recovery turbine configured to receive pressurized oxygen depleted air from the second oxygen depleted air outlet 195 and rotate the turbine shaft 145, causing the recirculated $CO_2$ compressor 146 to transport recirculated $CO_2$ through the recirculated $CO_2$ inlet port 136 to the preheating unit 118.

A power meter 199 is connected to the main turbine 110, wherein the power meter is configured to generate power measurement signals, a $CO_2$ meter 197 is connected to the second port of the splitter, wherein the $CO_2$ meter is configured to generate $CO_2$ measurement signals, wherein the control system is configured to receive the power and $CO_2$ measurement signals, The control system is operatively connected to the main air compressor 110, the power turbine 140, the condenser 142, the splitter 193, the recirculated $CO_2$ compressor 146 and the depleted air recovery turbine 132 to adjust a speed of the main compressor, operating conditions of the power turbine, the condenser, the recirculated $CO_2$ compressor and the depleted air recovery turbine and adjust a ratio of the first and second portions to generate power without releasing $CO_2$.

Thermally insulated tubing is connected between the combustion outlet port and the main turbine input port and between the second oxygen depleted air outlet and a depleted air recovery turbine inlet port and heat exchange tubing is connected between the main turbine output port and the first port of the condenser, between the second port of the condenser and the splitter, between the splitter and the recirculated $CO_2$ compressor, and between the recirculated $CO_2$ compressor outlet port and the recirculated $CO_2$ inlet port.

The main turbine 110 is a gas turbine configured to expand $CO_2$ and water received from the first outlet port to generate power.

The second embodiment is illustrated with respect to FIG. 1, 2A, 2B, 2C and FIG. 6. The second embodiment describes a method for using an ion transfer membrane micromixer headend for power generation, comprising preheating fuel and recirculated carbon dioxide ($CO_2$) in a preheating unit 118, receiving pressurized air, from a main air compressor 110, into an air manifold 112 for transporting the pressurized air to a combustion unit, receiving the pressurized air into a plurality of air tubes 122 located in the combustion unit 114, wherein the combustion unit is configured for heating the pressurized air, receiving the heated pressurized air into a headend 116 connected to the combustor, the headend including a shell surrounding a plurality of ceramic ion transfer membrane (ITM) tubes 126 equally spaced within the headend, receiving the preheated fuel and recirculated $CO_2$ into the headend at a location opposite the combustor, wherein each of the plurality of ITM tubes is configured for separating oxygen ($O_2$) from the heated pressurized air and mixing the $O_2$ with the recirculated $CO_2$ and fuel.

The method continues by burning, by the combustion unit, the mixture of $O_2$, $CO_2$ and fuel in flamelets 120 extending between the longitudinal air tubes, and generating combustion products, exhausting the pressurized air into a heat exchange tube 130 in the preheating unit, transporting the combustion products to a gas power turbine 140, generating electrical power by expanding the combustion products into the gas power turbine, exhausting the combustion products from the gas power turbine, condensing, by a condenser 142, the exhausted combustion products to separate water and $CO_2$, separating, by a splitter 198, the $CO_2$ into a first portion and a second portion, and sequestering, in a $CO_2$ storage location 144, the first portion.

The method further comprises receiving, by an oxygen depleted air pressure recovery turbine 132, oxygen depleted pressurized air from the heat exchange tube 130, rotating a shaft of the oxygen depleted air pressure recovery turbine 145 by expanding the oxygen depleted pressurized air, rotating, by the shaft of the oxygen depleted air pressure recovery turbine, a recirculated $CO_2$ compressor 146, compressing, by the recirculated $CO_2$ compressor, the second portion of the $CO_2$, and transporting the second portion to the preheating unit 118.

The method includes a control system 180 operatively connected to the main air compressor, the power turbine, the condenser, the splitter, the recirculated $CO_2$ compressor and the oxygen depleted air recovery turbine and adjusting, by the control system, a speed of the main air compressor, adjusting operating conditions of the power turbine, the condenser, the recirculated $CO_2$ compressor and the depleted air recovery turbine, and adjusting, by the control system, a ratio of the first and second portions.

The method includes generating, by at least one thermocouple 193 in the combustor 114, a temperature signal when the temperature of the air in the air tubes is greater than a threshold, receiving, by the control system, the temperature signal, igniting, by a signal generated by the control system operatively connected to at least one igniter, the at least one igniter, wherein the threshold is preferably in the range of 400 to 700° C., more preferably in the range of 500 to 700° C., even more preferably 550 to 700° C., most preferably 550° C.

The method further includes generating, by a power meter 199 connected to the main turbine 110, power measurement signals, generating, by a $CO_2$ meter 197 connected to the second port of the splitter 198, $CO_2$ measurement signals, receiving, by the control system, the power and $CO_2$ measurement signals, wherein the control system is operatively connected to the main air compressor, the power turbine, the condenser, the splitter, the recirculated $CO_2$ compressor and the depleted air recovery turbine, the control system including a controller 674 having circuitry and a processor 676 having program instructions configured to instruct a processor for: adjusting a speed of the main compressor, adjusting operating conditions of the power turbine, the condenser, the recirculated $CO_2$ compressor and the depleted air recovery turbine, adjusting a ratio of the first and second portions, and generating power without adding $CO_2$ to the surrounding environment.

The third embodiment is illustrated with respect to FIG. 1, 2A, 2B, 2C and FIG. 6. The third embodiment describes a non-transitory computer readable medium having instructions stored therein that, when executed by one or more processor, cause the one or more processors to perform a method for clean power generation by a gas turbine, comprising preheating fuel and recirculated carbon dioxide ($CO_2$) in a preheating unit, receiving pressurized air, from a main air compressor, into an air manifold for transporting the pressurized air, receiving the pressurized air into a plurality of longitudinal air tubes located in a combustion unit, wherein the combustion unit is configured for heating the pressurized air, receiving the heated pressurized air into a headend connected to the combustor, the headend including a shell surrounding a plurality of ceramic ion transfer membrane (ITM) tubes equally spaced within the headend, receiving the preheated fuel and recirculated $CO_2$ into the headend at a location opposite the combustor, wherein each of the plurality of ITM tubes is configured for separating oxygen ($O_2$) from the heated pressurized air and mixing the $O_2$ with the recirculated $CO_2$ and fuel, burning, by the combustion unit, the mixture of $O_2$, $CO_2$ and fuel in flamelets extending between the air tubes, and generating combustion products, exhausting the pressurized air into a heat exchange tube in the preheating unit, transporting the combustion products to a gas power turbine, generating electrical power by expanding the combustion products into the gas power turbine, exhausting the combustion products from the gas power turbine, condensing, by a condenser, the exhausted combustion products to separate water and $CO_2$, splitting, by a splitter, the $CO_2$ into a first portion and a second portion, sequestering, in a $CO_2$ storage location, the first portion, receiving, by an oxygen depleted air pressure recovery turbine, oxygen depleted pressurized air from the heat exchange tube, rotating a shaft of the oxygen depleted air pressure recovery turbine by expanding the oxygen depleted pressurized air, rotating, by the shaft of the oxygen depleted air pressure recovery turbine, a recirculated $CO_2$ compressor, compressing, by the recirculated $CO_2$ compressor, the second portion of the $CO_2$, transporting the second portion to the preheating unit, adjusting, by a control system operatively connected to the main air compressor, the power turbine, the condenser, the splitter, the recirculated $CO_2$ compressor and the oxygen depleted air recovery turbine, a speed of the main air compressor, operating conditions of the power turbine, the condenser, the recirculated $CO_2$ compressor and the depleted air recovery turbine and a ratio of the first and second portions, generating, by at least one thermocouple in the combustor, a temperature signal when the temperature of the air in the air tubes is greater than a threshold, receiving, by the control system, the temperature signal, igniting, by a signal generated by the control system operatively connected to at least one igniter, the at least one igniter, generating, by a power meter connected to the main turbine, power measurement signals, generating, by a $CO_2$ meter connected to the second port of the splitter, $CO_2$ measurement signals, receiving, by the control system, the power and $CO_2$ measurement signals, wherein the control system is operatively connected to the main air compressor, the power turbine, the condenser, the splitter, the recirculated $CO_2$ compressor and the depleted air recovery turbine, the control system including a controller having circuitry and a processor having program instructions configured to instruct a processor for adjusting a speed of the main compressor, adjusting operating conditions of the power turbine, the condenser, the recirculated $CO_2$ compressor and the depleted air recovery turbine, adjusting a ratio of the first and second portions, and generating clean power without adding $CO_2$ to the surrounding environment.

Combustion instabilities are physical phenomena occurring in a reacting flow (e.g., a flame) in which some perturbations, even very small ones, grow and then become large enough to alter the features of the flow in some particular way. The appearance of combustion instabilities is undesirable. For instance, thermo-acoustic instabilities are a major hazard to gas turbines. Because of these hazards, the engineering reactor process of engines involves the determination of a stability map which identifies a combustion-instability region and attempts are made to either eliminate this region or move the operating region away from it. Blowout of the flame may result from these thermo-acoustic instabilities.

In order to design and test the micromixer burner, a gas-turbine combustor was designed for oxy-methane combustion that mimics air-fuel micromixers in operational DLE gas turbines. Premixed $CH_4/O_2/CO_2$ flames were examined under atmospheric pressure and temperature (300 K), over ranges of oxygen fraction (OF) and equivalence ratio ($\varphi$) of 25-70% and 0.10-0.60, respectively. A constant jet velocity of 5.2 m/sec was maintained throughout the investigation, which was achieved by adjusting the flow rates of the individual reactant gases. The flow rates were controlled by mass flow controllers. In a non-limiting example, the mass flow controllers may be the MKS instruments Inc., Model M100B. (See: "MKS Type M100B Mass-Flow Controller and Type M10MB Mass-Flo Meter, MKS Instrument, Inc, Andover, Mass., U.S.A.).

The combustor stability map was determined by quantifying the blowout and acoustic limits within the OF-$\varphi$ space. It was found that the acoustic and blowout limits follow a path of constant adiabatic flame temperature ($T_{ad}$), which implies that $T_{ad}$ is a key control parameter of combustor stability. This agrees with what was reported in past studies for swirl-stabilized combustors, but are applied to the ITM micromixer burner of the present disclosure. The micromixer technology exhibited superior performance compared to swirl-based technologies, especially at low combustor loads, which is of importance to increasing the turndown of future oxy-fuel gas turbines. It was also found that the shapes of flames of the same $T_{ad}$ are nearly identical, which also indicates the primary effect of $T_{ad}$ on flame shape. The combustor may include an igniter and a flame detector to start and monitor the combustion process.

Figure 2A:
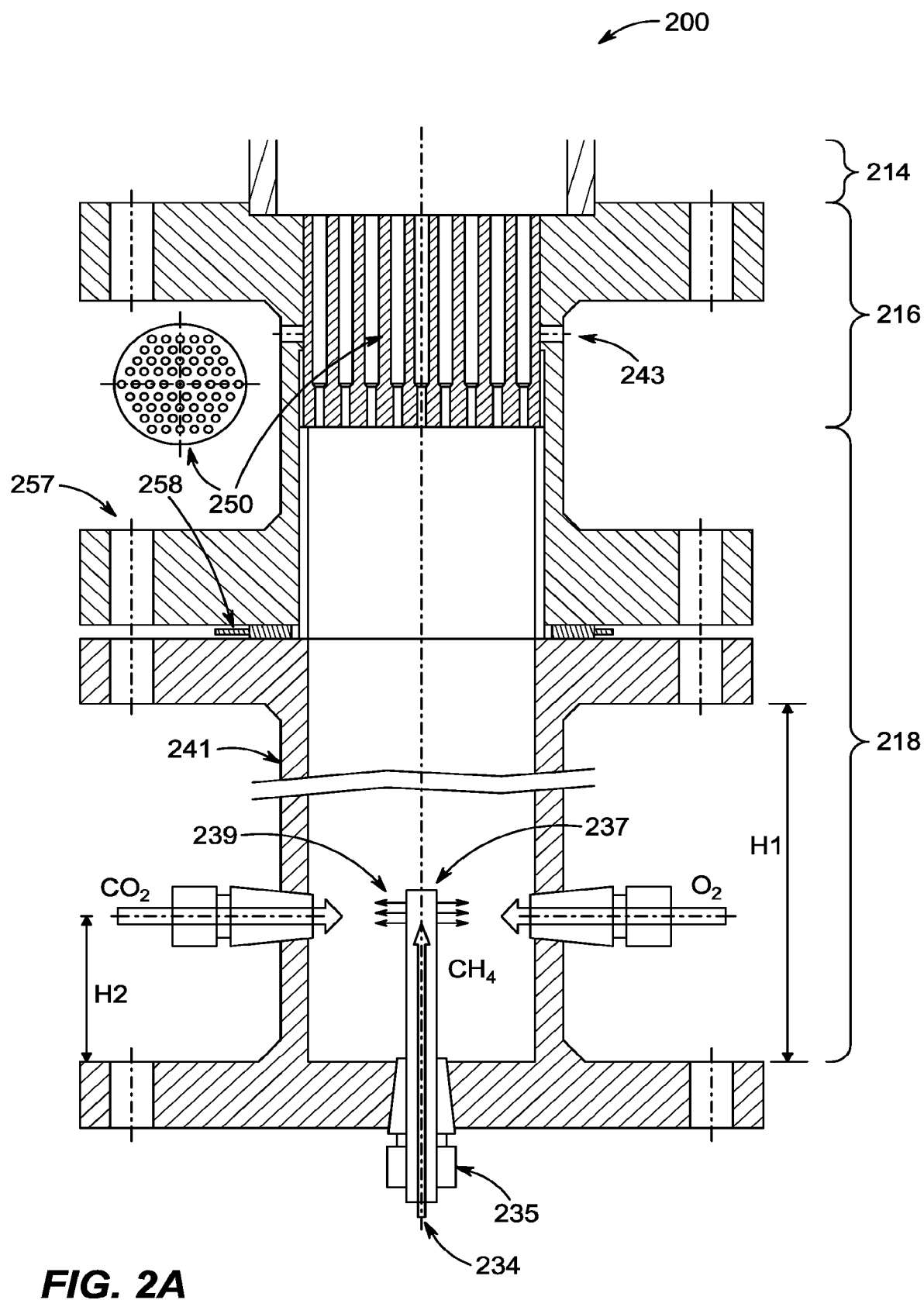
FIG. 2A illustrates a simplified experimental combustor.
Figures 2B, 2C:
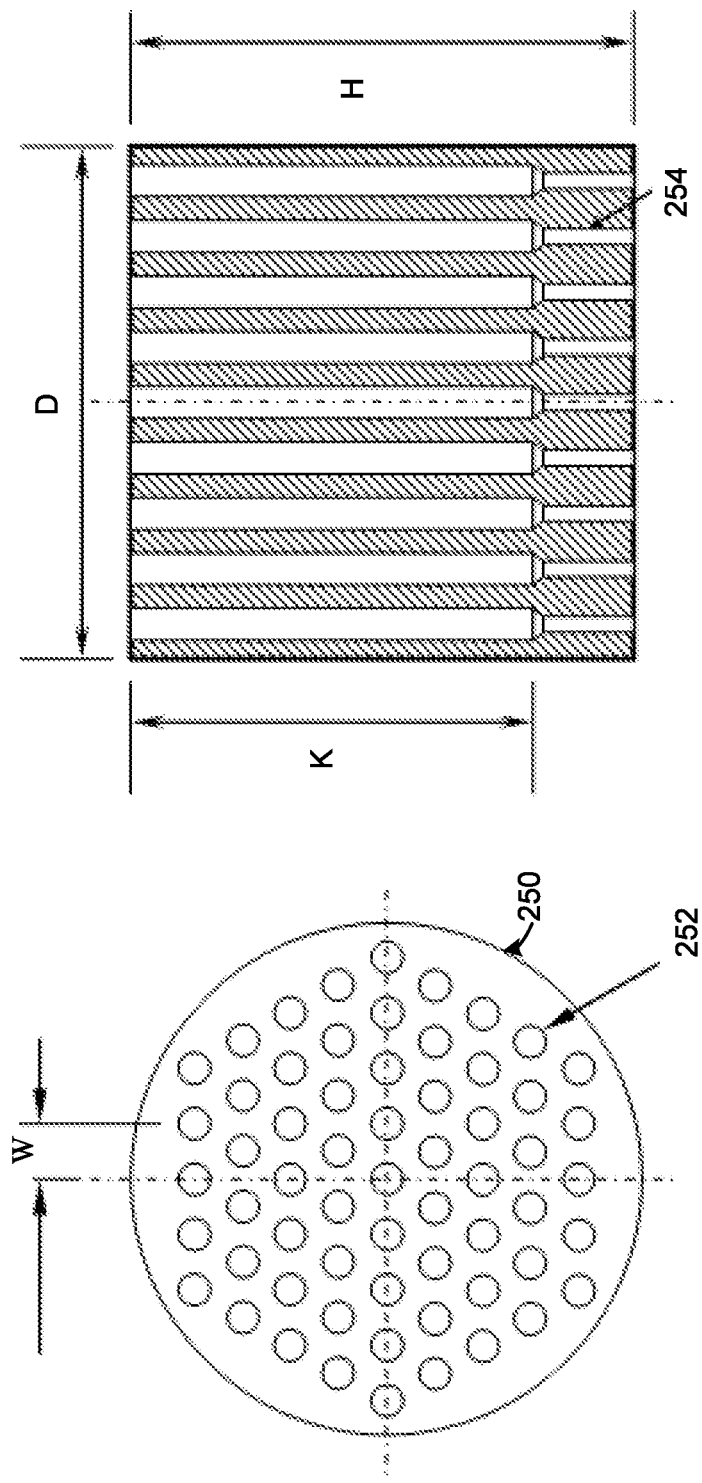
FIG. 2B illustrates the top view of a 316-L stainless-steel experimental burner head end comprising 61 holes 252 (3.18 mm diameter) distributed on a hexagonal matrix.
FIG. 2C illustrates a burner headend design.

FIG. 2A shows the experimental combustor 200 in axial cross section for the economizer unit 118 and the micromixer headend 116. The experimental combustor 200 is a simplified version of the burner system 100 subject of the present disclosure. Oxygen is not separated from air in the micromixer headend 250; instead, pure O2 is fed directly into the mixing plenum 218 along with fuel and RCO2. No preheating is performed inside the mixing plenum; i.e., the mixture of fuel, $O_2$, and $CO_2$ enters the micromixer headend at room temperature. Since air separation is not performed in the micromixer headend 250, the air manifold 112 and air tubes 122 have been removed from the simplified experimental combustor 200. The combustion unit 114 has, thus, been simplified to the quartz enclosure 214. Quartz was selected as wall material just to facilitate visual imaging of the experimental flame. The micromixer headend 250 is secured inside the flanged pipe 257 by screws 243. In a non-limiting example, four screws are used. However, the housing may be attached by as many screws as necessary to provide a tight fit. A gasket 258 prevents leakage at the interface of flanged pipe 257 and mixing plenum 241. The flanged pipe 257 and mixing plenum 241 are made of stainless steel. Other components that have been removed in the simplified experimental combustor 200 are the heat exchange tube 130, main compressor 110, main turbine 140, condenser 142, splitter 198, $RCO_2$ compressor 146, depleted-air pressure-recovery turbine 132, and the thermally insulated pipe 196. The simplified experimental combustor 200 serves only to examine the performance of micromixer technology for the first time under oxy-fuel combustion conditions.

FIG. 2B illustrates the radial cross section of a 316-L stainless-steel experimental burner headend 250 comprising 61 holes 252 (3.18 mm diameter) distributed on a hexagonal matrix to maintain consistent spacing, W, of 5.5 mm between each core jet and six surrounding jets. As illustrated in FIG. 2C, the inlet of each hole is of smaller diameter (1.6 mm) to act as a flame arrestor 254 that prevents flashback into the mixing plenum 218 upstream of the burner headend. The height, H, of burner headend is 50 mm, while the main holes 252 (3.18 mm) have height, K, of 40 mm deep, so the arrestor section is approximately 10 mm in height. The aspect ratio (L/D) of the main holes is thus 40/3.18=12.6, which is large enough to facilitate fully developed flow at the flame base. The main holes were machined with a drill bit of 120° tip angle, which created gradual expansion from the arrestor diameter to the main diameter. Such gradual expansion aids in achieving fully developed flow within the height of main holes. The diameter, D, of the headend is 50.8 mm.

All gases were supplied from compressed cylinders (not shown). The fuel tube 234 is held by a bored through fitting 235 into the mixing plenum 218 as shown in FIG. 2A. The individual flow rates were controlled by mass flow controllers through the aid of a computer interface to achieve a common desired jet velocity of 5.2 m/sec for all the flames examined to maintain similar flow conditions and turbulence intensities for all isothermal flow fields. The fuel tube 234 has a closed end 237. Radial holes at separated axial levels are staggered to provide jets for fuel injection into the mixing plenum 218. In a non-limiting example, there are three levels of four radial holes, which gives 12 staggered radial holes. The combustor 214 (partially shown in FIG. 2A) is made of quartz. In the experiment, the inner diameter is 63.5 mm and it is 30 cm long. The height H1 is preferably 1 m and the height H2 is preferably 35 cm.

Figure 3A:
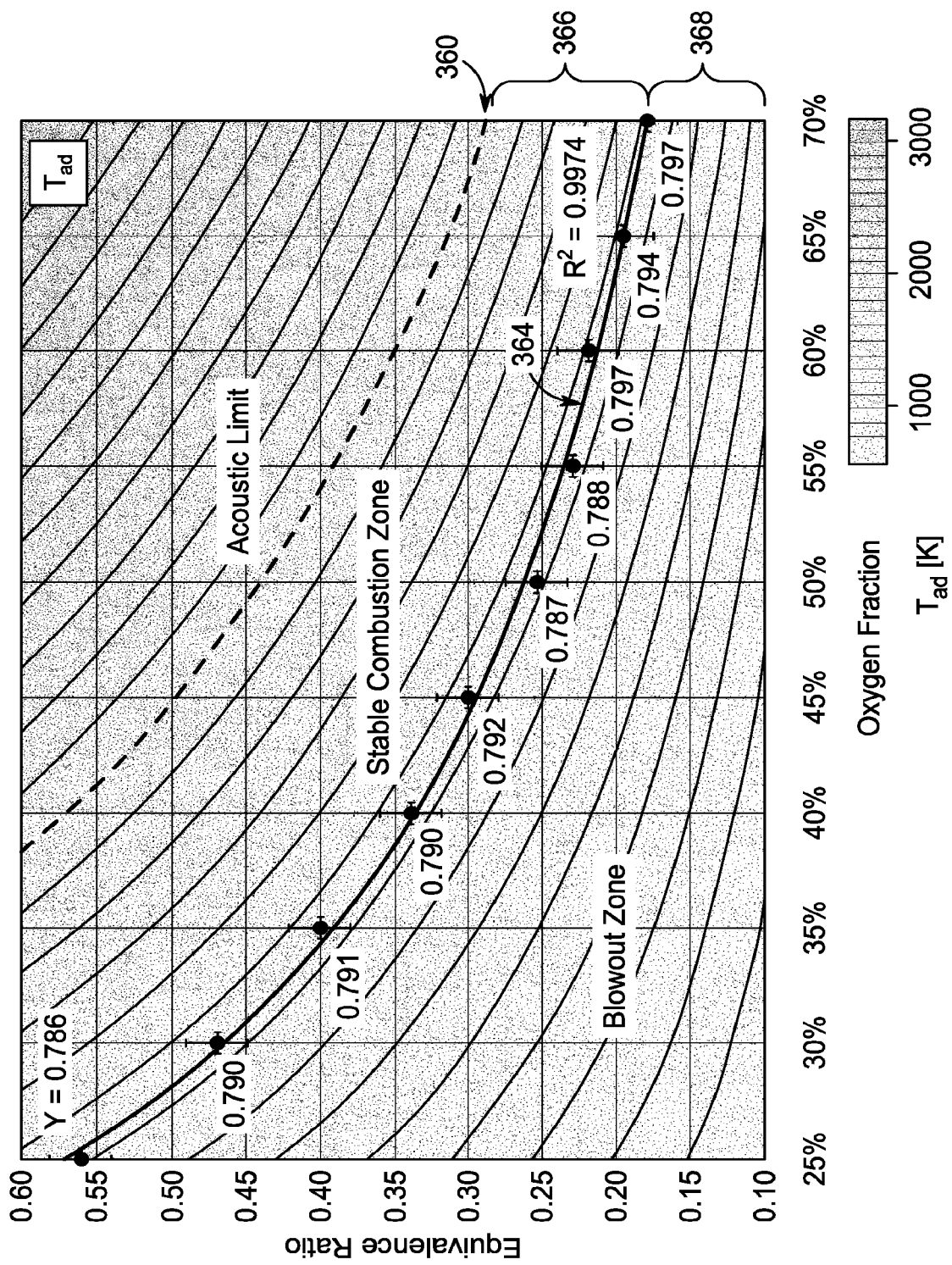
FIG. 3A-3D illustrate combustor stability maps plotted against background contours of different operability parameters.
Figure 3B:
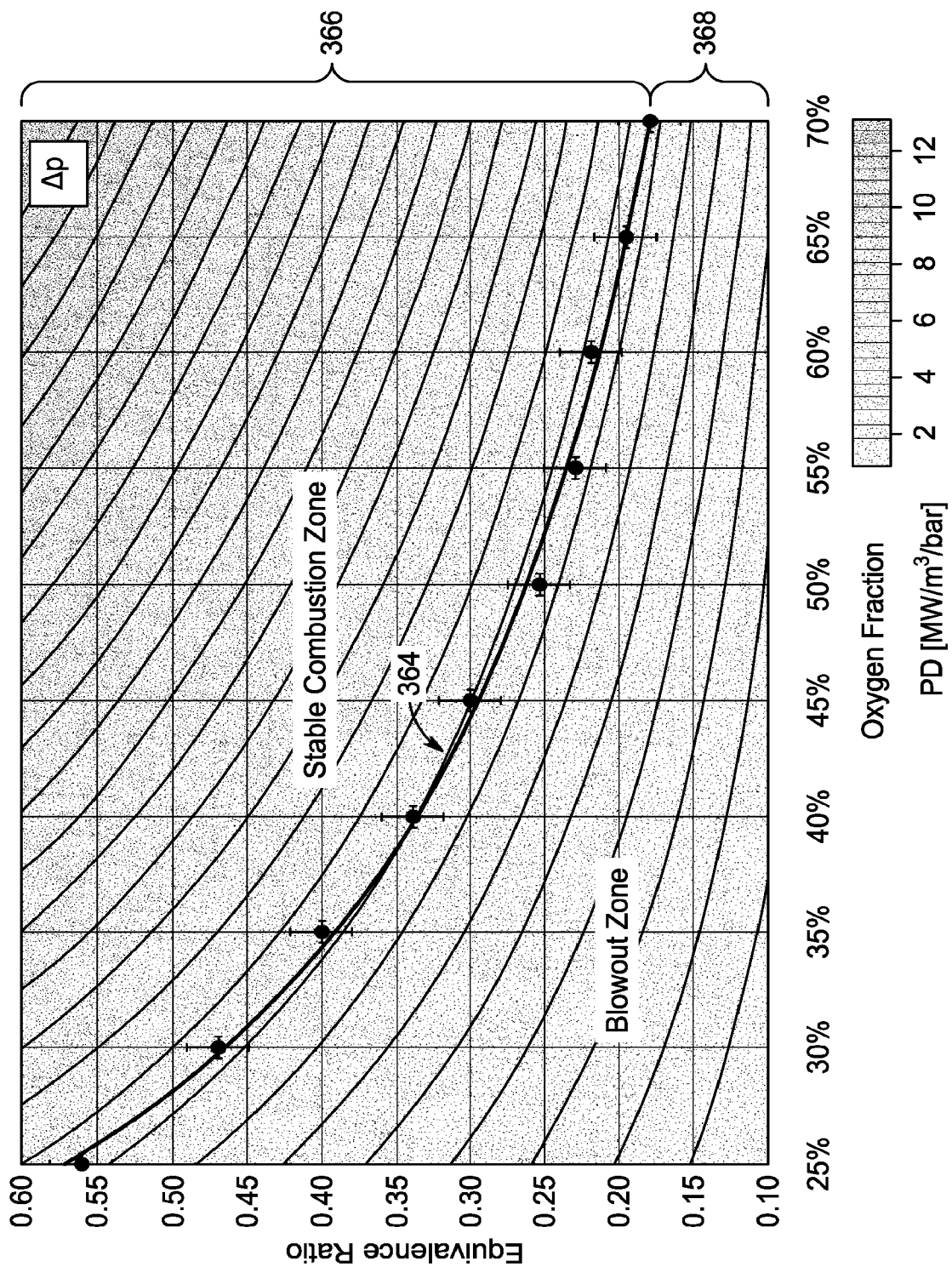
Figure 3C:
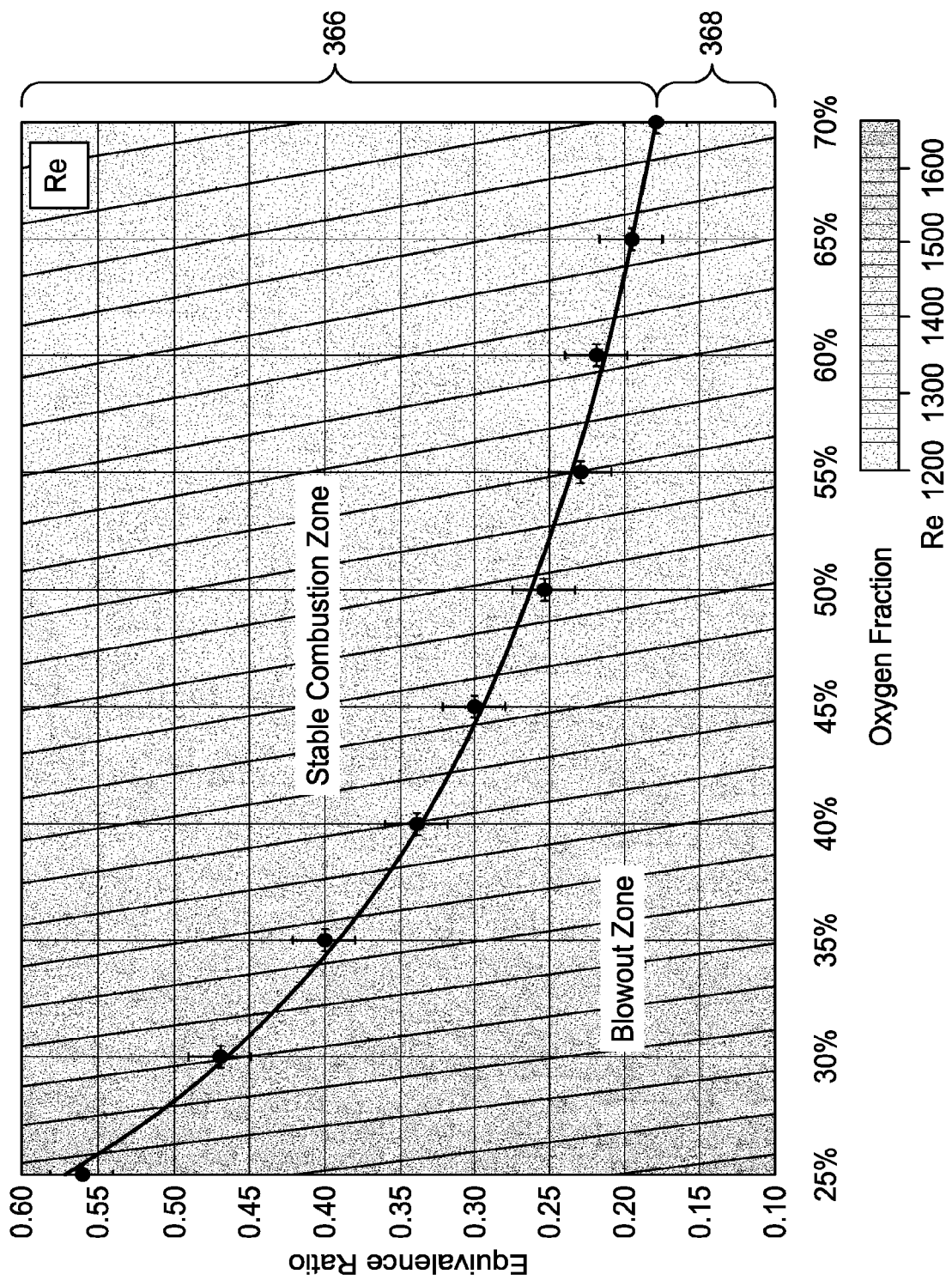
Figure 3D:
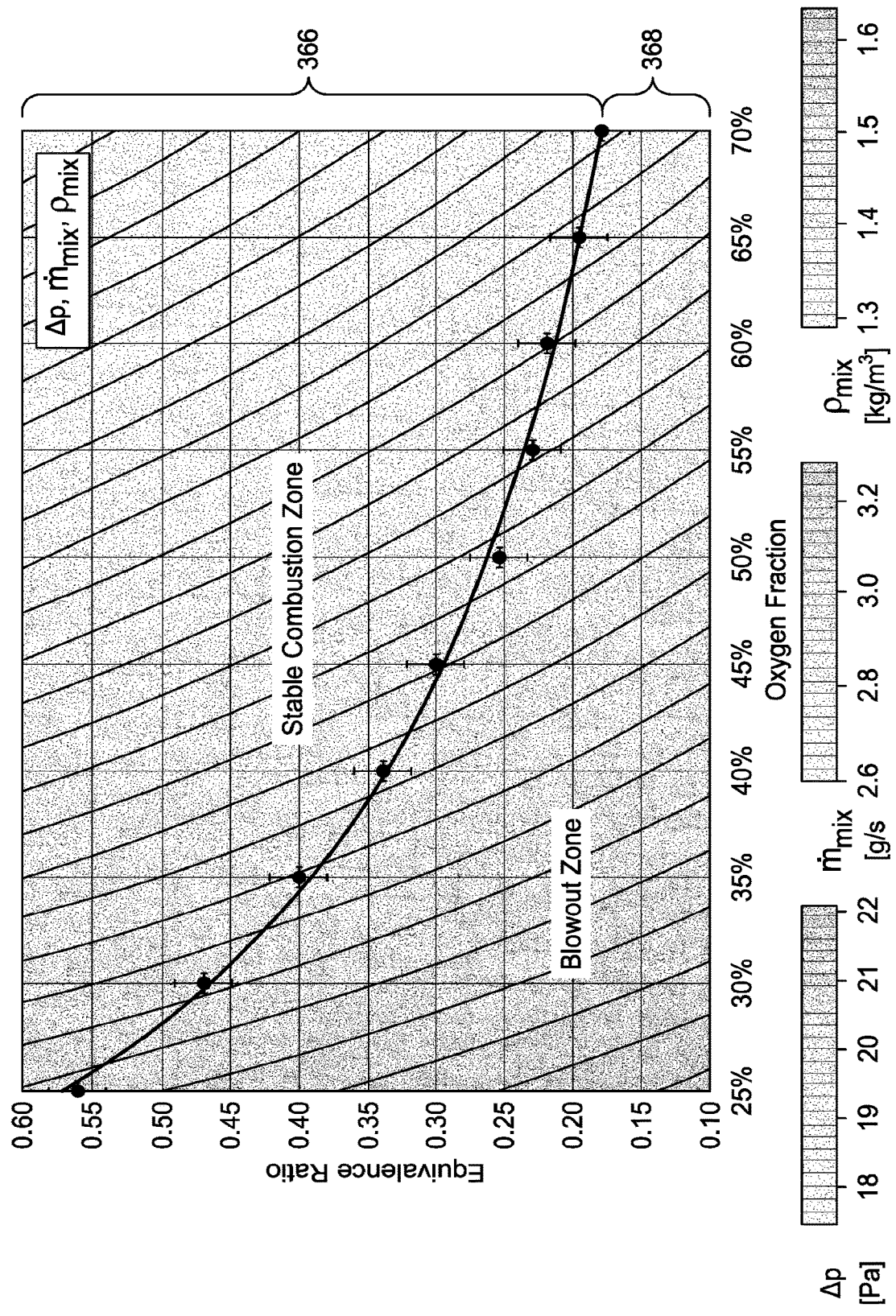

The stability map of premixed $CH_4/O_2/CO_2$ flames in the examined burner geometry is presented within the OF-φ space in FIG. 3A-3D. Stable combustion exists in the zone between the blowout and acoustic limits, characterized by the solid 364 and dashed curves 360, respectively. FIG. 3A provides a primary unexpected finding, namely that, under similar cold-flow conditions, the stability limits of premixed oxy-methane flames in a micromixer combustor follow the contours of constant adiabatic flame temperature ($T_{ad}$). $T_{ad}$ was ranged from about 600 K to about 3100 K. This conclusion has been proven previously for premixed swirl-stabilized $CH_4/O_2/CO_2$ and $CH_4/O_2/N_2$ flames, but the finding here is that the same conclusion applies to micromixers, which has a key implication in burner design. Manufacturers of lean pre-mixed (LPM) air-based gas turbines already use $T_{ad}$ and the power drop ($\Delta p$) across combustor headend to control load and flame stability. FIG. 3B shows the effect of the combustor power density (PD) on the stability of the combustion zone. PD ranged from about 3 to about 13 $MW/m^3$.bar. FIG. 3C shows the stable combustion zone for the changes in Reynolds number, Re, from about 1200 to about 1650. The Reynolds number, which is dimensionless, expresses the ratio of inertial forces to viscous forces, and is related to the thermoacoustic characteristics of the air flow. FIG. 3D shows the stable combustion zone for changes in power drop across the headend, ($\Delta p$), total flow rate of the mixed gases, remix and density of the mixed gases, $\rho_{mix}$. $\Delta p$ is typically kept constant within a given load module, which results in constant inlet bulk air velocity. Aspects of the present disclosure target fixed inlet jet velocity for this reason.

FIG. 3A-3D demonstrate that the main factor in limiting the stable combustion zone is variation in the constant adiabatic flame temperature ($T_{ad}$). Thus $T_{ad}$ should be the primary parameter in the design and operation of future oxy-fuel gas-turbine combustors, and not the oxygen fraction (OF) or equivalence ratio (φ), especially as the current findings confirm those previously reported showing that the static stability of premixed oxy-methane and air-methane flames is primarily controlled by $T_{ad}$ in different combustor technologies.

Figure 4:
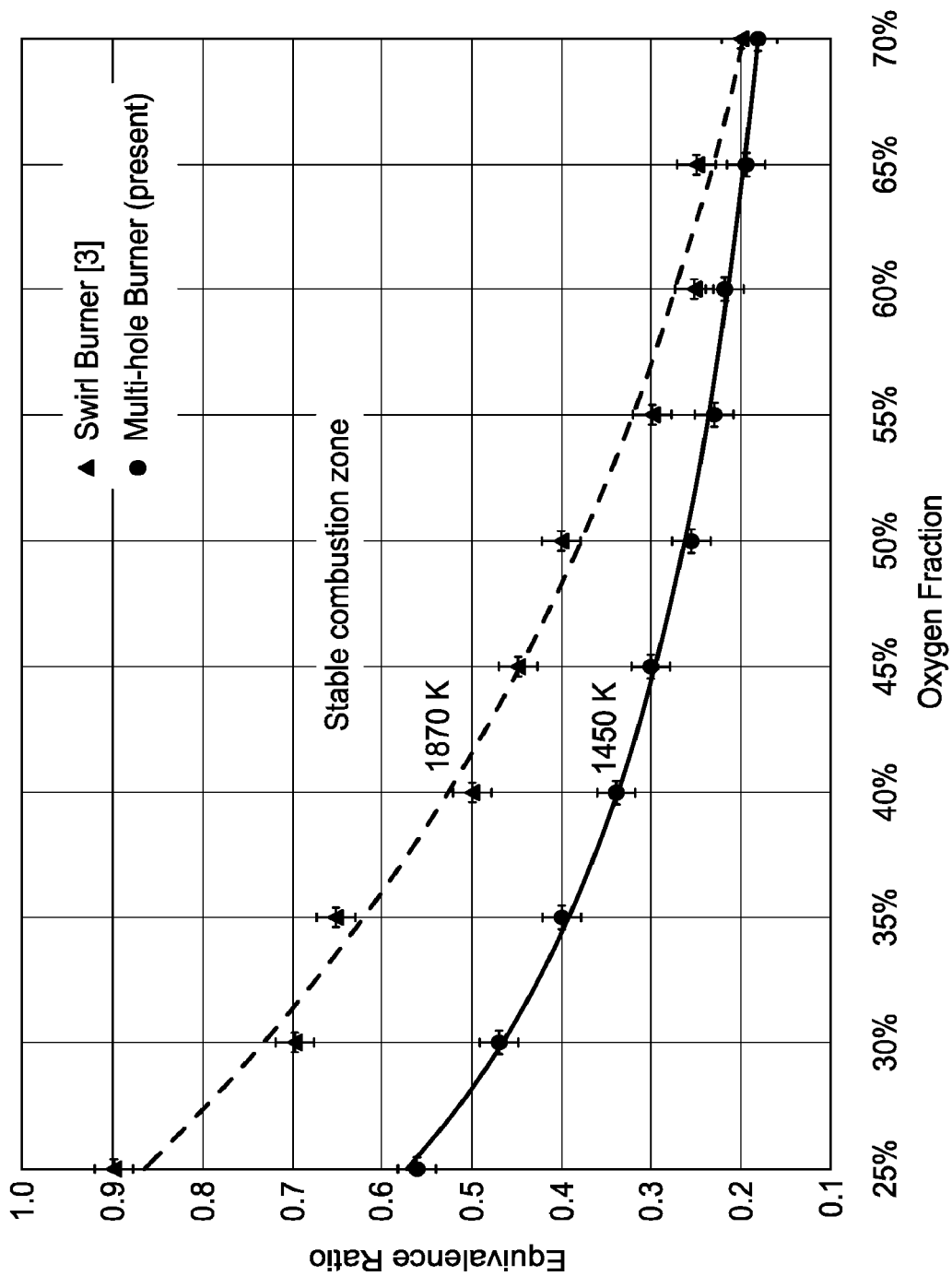
FIG. 4 illustrates a comparison of the blowout limits of different burner technologies over the same oxygen fraction range at the same constant inlet jet velocity.

Comparing the blowout limit of premixed $CH_4/O_2/CO_2$ flames in the micromixer burner of the present disclosure to the corresponding limit of a swirl-stabilized burner, as shown in FIG. 4, exhibits that the micromixer combustor has a larger stable combustion zone, as evidenced by the ability to reach lower $T_{ad}$ prior to blowout, i.e., 1450 K vs. 1870 K. This improvement is magnified at low oxygen fractions, which is very beneficial in extending the turndown capability (low-load limit) of oxy-fuel gas turbines. Oxy-fuel flames have lower stability in comparison to air-fuel flames, so using a burner technology that widens the operability window on the blowout side is of critical importance to the operation of the gas turbine using oxy-fuel.

Figure 5:
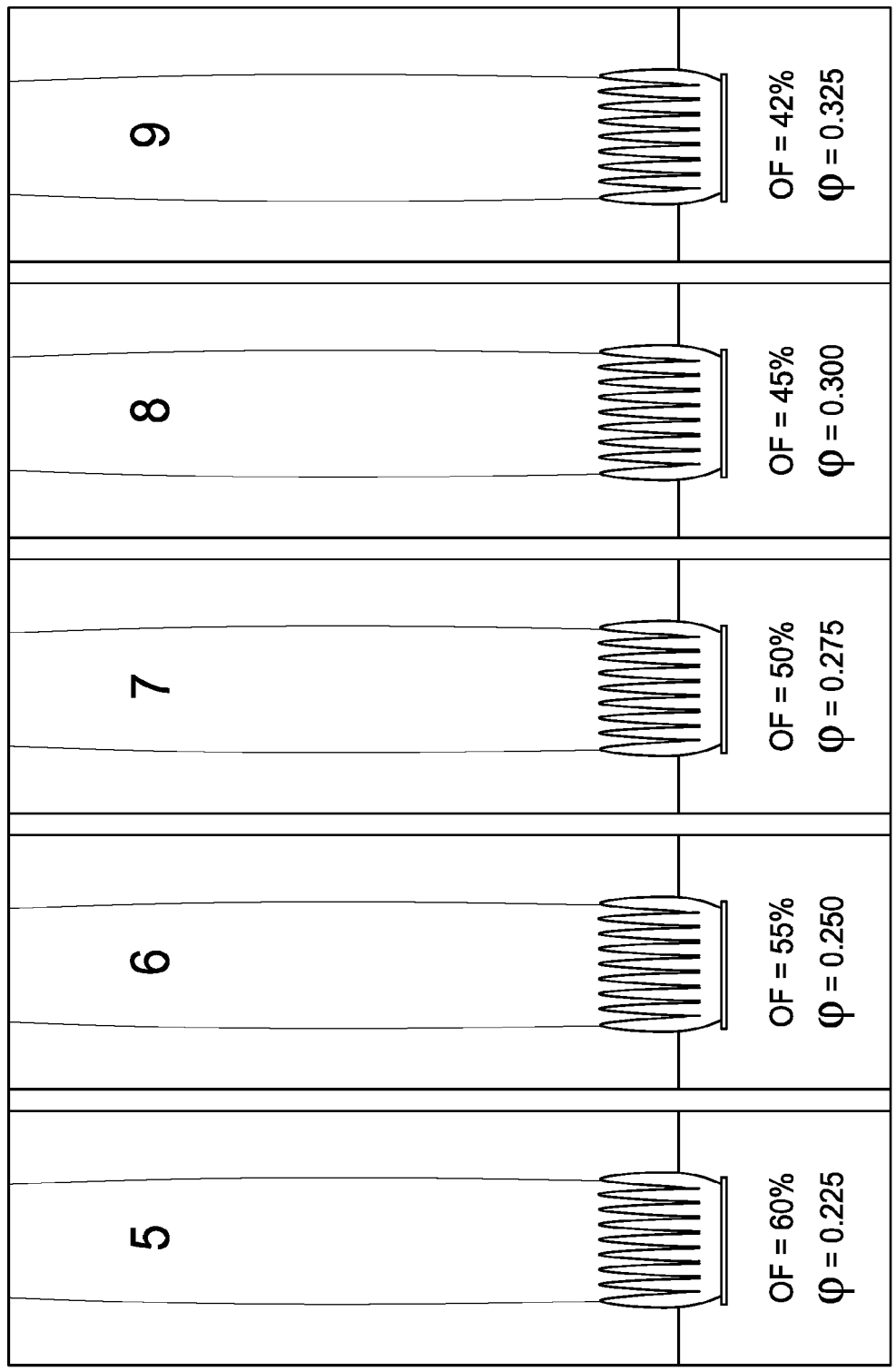
FIG. 5 illustrates the effect of maintaining constant adiabatic flame temperature on flame shape while varying both equivalence ratio and oxygen fraction.

Flame imaging was also performed to substantiate the finding based on $T_{ad}$, as illustrated in FIG. 5, which shows the effect of varying both φ and OF at $T_{ad}$=1900 K. It can be seen that flames of the same $T_{ad}$ have almost the same shape and size, despite the differences in φ and OF. All five flames appear almost identical, which proves that $T_{ad}$ controls flame macrostructure under similar cold-flow conditions.

Figure 7:
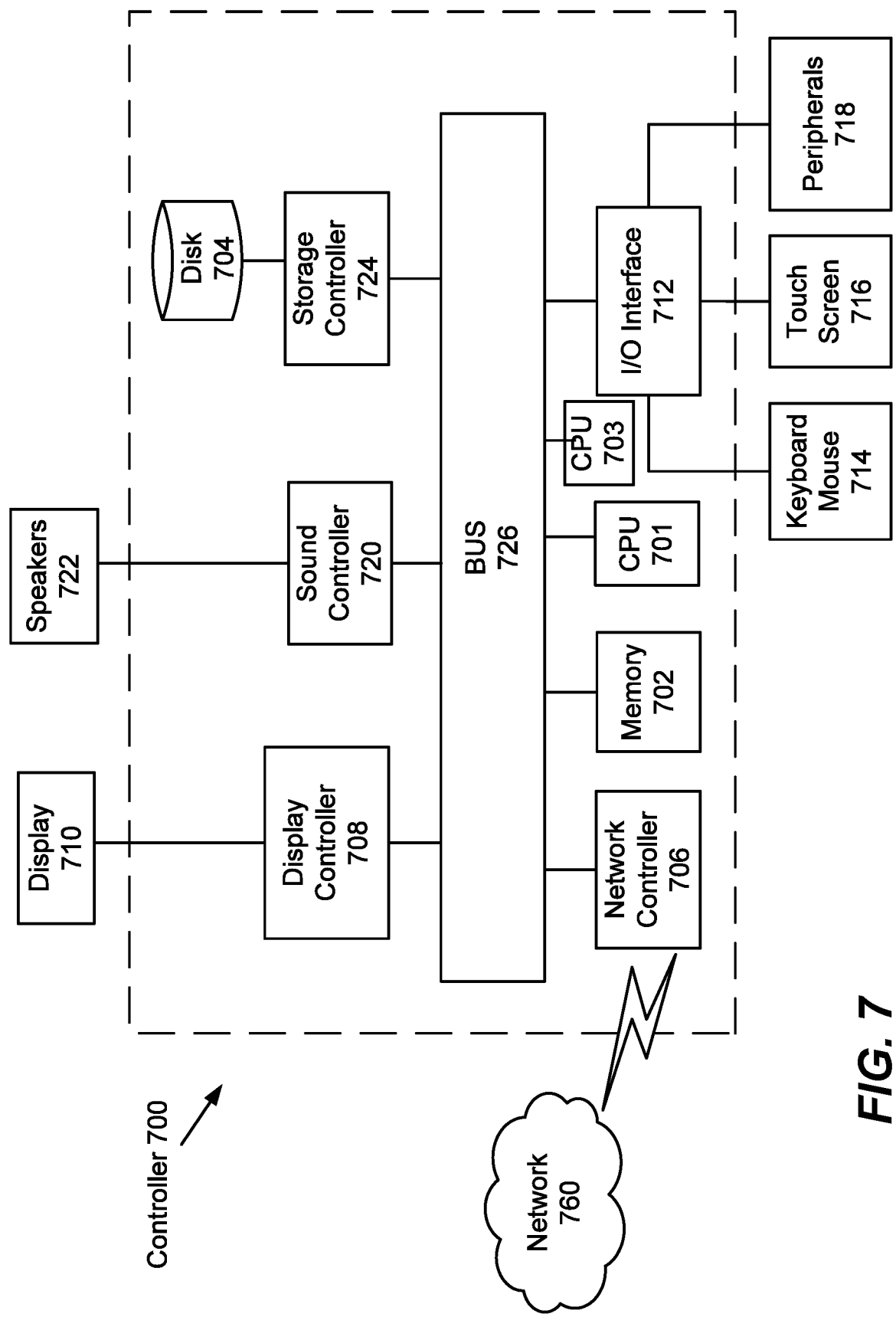
FIG. 7 is an illustration of a non-limiting example of details of computing hardware used in the computing system, according to certain embodiments.

Next, further details of the hardware description of the computing environment of FIG. 6 according to exemplary embodiments is described with reference to FIG. 7. In FIG. 7, a controller 700 is described is representative of the control system 180 of FIG. 6 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 701, 703 and an operating system such as Microsoft Windows, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
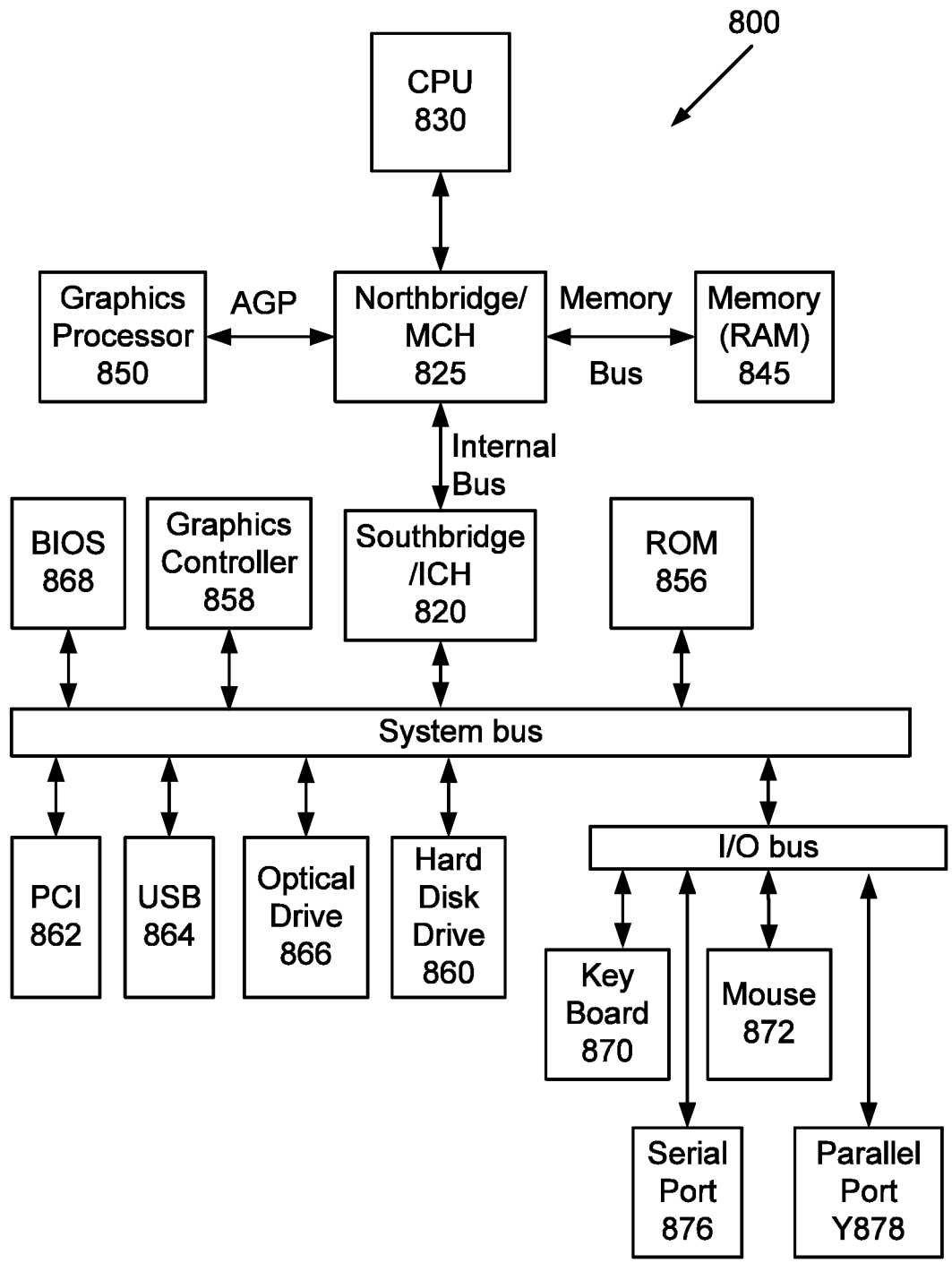
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
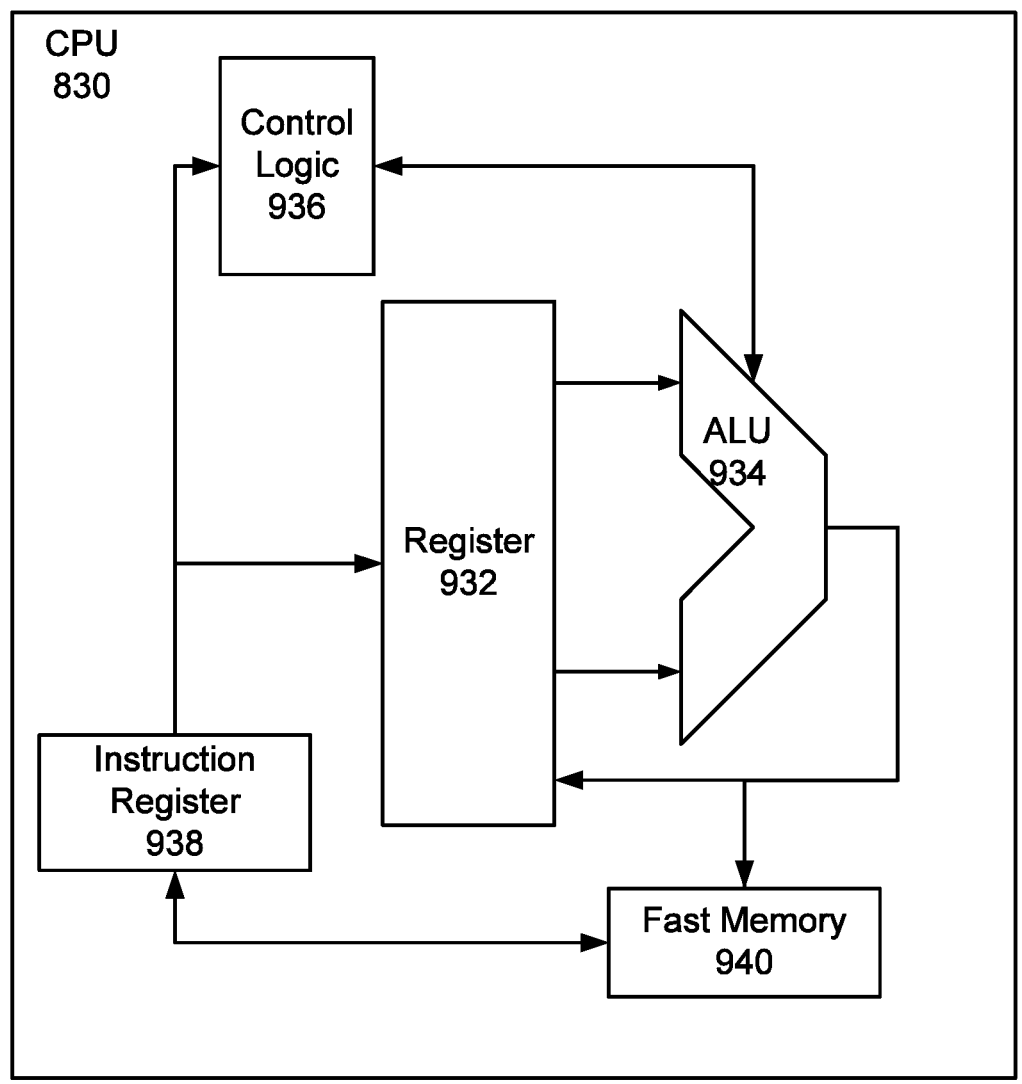
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
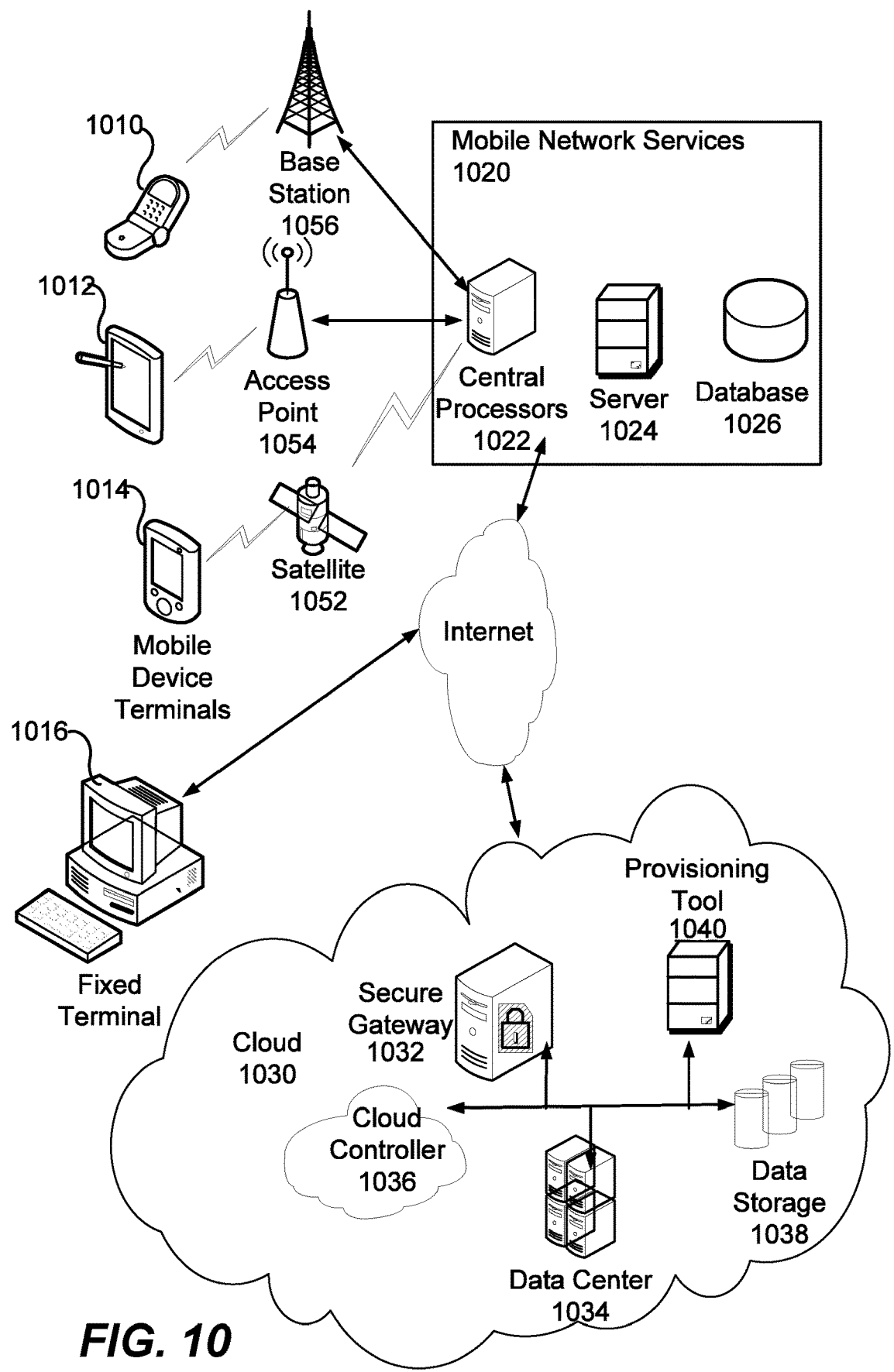
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A burner system for clean combustion in gas turbines, comprising:
    an air manifold having an air inlet for receiving pressurized air;
    a combustor including a first shell surrounding a plurality of air tubes, wherein each air tube is connected to the air manifold, wherein the combustor is configured to burn a mixture of fuel, carbon dioxide ($CO_2$) and oxygen ($O_2$), wherein burning the mixture heats the pressurized air in the air tubes, the combustor further including a combustion outlet port, at least one igniter and at least one thermocouple;
    a headend connected to the combustor, the headend including a second shell surrounding a plurality of ceramic ion transfer membrane (ITM) tubes equally spaced longitudinally within the headend, wherein each air tube is further connected to an air space in the headend between the plurality of ITM tubes, the headend further including a first oxygen depleted air outlet;
    a preheating unit connected to the headend, the preheating unit having a third shell surrounding a heat exchange tube, a fuel port, a recirculated $CO_2$ inlet port, an oxygen depleted air inlet and a second oxygen depleted air outlet;
    a thermally insulated pipe connected between the first oxygen depleted air outlet and the oxygen depleted air inlet;
    wherein the preheating unit receives fuel and recirculated $CO_2$ from the fuel port and recirculated $CO_2$ port respectively, wherein the fuel and recycled $CO_2$ are preheated in the preheating unit, enter the ITM tubes, mix homogeneously with oxygen, burn as flamelets, and generate combustion products in the combustor, wherein the combustion products exit the combustor at the combustion outlet port,
    wherein the burner system further comprises:
        a computer system operatively connected to the air inlet, the first oxygen depleted air outlet, the at least one igniter, the at least one thermocouple, the second depleted air outlet, the fuel port and the recirculated $CO_2$ port;
        wherein the air inlet, the first oxygen depleted air outlet, the second depleted air outlet, the fuel port and the recirculated $CO_2$ port are computer controlled valves;
        wherein the at least one thermocouple senses the temperature of the preheated fuel, oxygen and recirculated $CO_2$ and generates a signal to the computer system when the temperature is above a threshold;
        wherein the computer system actuates each computer controlled valve to open the air inlet, the first oxygen depleted air outlet, the second depleted air outlet, the fuel port and the recirculated $CO_2$ port upon receiving the signal;
        wherein at start-up the thermocouple senses the temperature of the preheated fuel, oxygen and recirculated $CO_2$ and generates a signal when the temperature is above a threshold; and
        wherein the computer actuates the at least one igniter to generate a spark in response to the signal.

2. The burner system of claim 1, wherein the air manifold, combustor, headend and preheating unit are an integrated unit.

3. The burner system of claim 1,
    wherein the plurality of air tubes of the combustor are an array of non-magnetic iron nickel-chromium alloy tubes; and
    wherein the first shell includes an inner shell of non-magnetic iron nickel-chromium alloy.

4. The burner system of claim 1, wherein the first, second and third shells are stainless steel.

5. The burner system of claim 1, wherein the plurality of ion transfer tubes (ITM) is an array of micro-membranes configured to separate oxygen from air and mix the oxygen, $CO_2$ and fuel homogeneously.

6. The burner system of claim 1, wherein each ITM tube has a large length to diameter ratio configured to prevent flashback of the flamelets.

* * * * *